United States Patent
Arora et al.

(10) Patent No.: US 8,577,371 B2
(45) Date of Patent: Nov. 5, 2013

(54) METHODS AND APPARATUS TO AVOID TRANSMISSION OF REDUNDANT NEIGHBOR CELL INFORMATION TO MOBILE STATIONS

(75) Inventors: Dinesh Kumar Arora, Waterloo (CA); Christopher Harris Snow, Kitchener (CA); Ayman Ahmed Abdel-Samad, Waterloo (CA); Nazih Almalki, Waterloo (CA); David Philip Hole, Slough (GB)

(73) Assignee: BlackBerry Limited, Waterloo (CA)

( * ) Notice: Subject to any disclaimer, the term of this patent is extended or adjusted under 35 U.S.C. 154(b) by 187 days.

(21) Appl. No.: 12/612,526

(22) Filed: Nov. 4, 2009

(65) Prior Publication Data

US 2011/0105158 A1 May 5, 2011

(51) Int. Cl.
H04W 4/00 (2009.01)
H04W 36/00 (2009.01)

(52) U.S. Cl.
USPC .............. 455/436; 455/432.1; 455/435.1; 455/437; 455/552.1

(58) Field of Classification Search
USPC ........ 455/432.1, 435.2, 436, 437, 552.1, 574; 370/329, 341, 350
See application file for complete search history.

(56) References Cited

U.S. PATENT DOCUMENTS

| 6,546,251 | B1 | 4/2003 | Dalsgaard et al. | |
|---|---|---|---|---|
| 6,628,946 | B1 * | 9/2003 | Wiberg et al. | 455/434 |
| 7,421,272 | B2 * | 9/2008 | Dalsgaard et al. | 455/438 |
| 7,978,645 | B2 | 7/2011 | Koo et al. | |
| 7,996,010 | B2 * | 8/2011 | Farnsworth et al. | 455/436 |
| 2006/0166693 | A1 * | 7/2006 | Jeong et al. | 455/525 |
| 2006/0251019 | A1 | 11/2006 | Dalsgaard et al. | |
| 2006/0280144 | A1 * | 12/2006 | Kangas | 370/329 |
| 2006/0291416 | A1 * | 12/2006 | Rexhepi et al. | 370/331 |
| 2009/0219871 | A1 | 9/2009 | Davis et al. | |
| 2011/0105120 | A1 | 5/2011 | Abdel-Samad et al. | |

FOREIGN PATENT DOCUMENTS

| CN | 102687543 | 9/2012 |
|---|---|---|
| CN | 102687562 | 9/2012 |
| EP | 1784034 | 5/2007 |
| EP | 2497288 | 9/2012 |
| EP | 2497302 | 9/2012 |
| WO | 2011055181 | 5/2011 |
| WO | 2011055182 | 5/2011 |

OTHER PUBLICATIONS

ETSI TS 101 349 V8.6.0, Digital Cellular Telecommunications system, Oct. 2000, http://www.etsi.org/deliver/etsi_ts/101300_101399/101349/08.06.00_60/ts_101349v080600p.pdf.*

(Continued)

*Primary Examiner* — Wesley Kim
(74) *Attorney, Agent, or Firm* — Hanley, Flight & Zimmerman, LLC

(57) ABSTRACT

Methods and apparatus to avoid transmission of redundant neighbor cell information to mobile stations. An example method to avoid transmission of at least some neighbor cell system information from a network to a mobile station disclosed herein comprises receiving neighbor cell system information, setting a validity indication representing whether the mobile station has valid neighbor cell system information associated with a neighbor cell, and sending the validity indication to the network.

19 Claims, 12 Drawing Sheets

(56) References Cited

OTHER PUBLICATIONS

Patent Cooperation Treaty, "International Search Report" issued by the International Searching Authority in connection with PCT Application No. PCT/IB2010/002638, mailed Jun. 21, 2011, (5 pages).
Patent Cooperation Treaty, "Written Opinion," issued by the International Searching Authority in connection with PCT Application No. PCT/IB2010/002638, mailed Jun. 21, 2011, (7 pages).
Patent Cooperation Treaty, "International Search Report" issued by the International Searching Authority in connection with PCT Application No. PCT/IB2010/002642, mailed Jul. 20, 2011, (5 pages).
Patent Cooperation Treaty, "Written Opinion," issued by the International Searching Authority in connection with PCT Application No. PCT/IB2010/002642 mailed Jul. 20, 2011, (9 pages).
"3rd Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 9)," 3GPP TS 44.060 version 9.0.0, May 2009, (586 pages).
"3rd Generation Partnership Project; Technical Specification Group Digital cellular telecommunications system (Phase 2+); General Packet Radio Service (GPRS); Mobile Station (MS)—Base Station System (BSS) interface; Radio Link Control/Medium Access Control (RLC/MAC) protocol (Release 1997)," 3GPP TS 04.60 version 6.10.0, Oct. 2000,(222 pages).
"3rd Generation Partnership Project; Technical Specification Group Digital cellular telecommunications system (Phase 2+); General Packet Radio Service (GPRS); Mobile Station (MS)—Base Station System (BSS) interface; Radio Link Control / Medium Access Control (RLC/MAC) protocol (Release 7)," 3GPP TS 44.060 version 7.13.0, Jul. 2008, (554 pages).
USPTO, "Final Office Action," issued in connection with U.S. Appl. No. 12/612,542, on Jun. 13, 2012 (14 pages).
Patent Cooperation Treaty, "International Preliminary Report on Patentability" issued by the International Searching Authority in connection with PCT Application No. PCT/IB2010/002638, mailed May 18, 2012 (9 pages).
Patent Cooperation Treaty, "International Preliminary Report on Patentability" issued by the International Searching Authority in connection with PCT Application No. PCT/IB2010/002642, mailed May 18, 2012 (9 pages).
USPTO, "Advisory Action," issued in connection with U.S. Appl. No. 12/612,542, dated Sep. 6, 2012 (4 pages).
USPTO, "Office Action," issued in connection with U.S. Appl. No. 12/612,542, dated Jan. 17, 2013 (13 pages).
United States Patent and Trademark Office, "Non-Final Office Action," issued in connection with U.S. Appl. No. 12/612,542 on Dec. 27, 2011 (13 pages).
European Patent Office, "Examination Report," issued in connection with European application No. 10 778 719.4, on Apr. 5, 2013, 4 pages.
European Patent Office, "Examination Report," issued in connection with European application No. 10 778 718.6, on Apr. 8, 2013, 4 pages.
Advisory Action, issued by the United States Patent and Trademark Office in connection with U.S. Appl. No. 12/612,542, on Sep. 18, 2013, 3 pages.
Final Office Action, issued by the United States Patent and Trademark Office in connection with U.S. Appl. No. 12/612,542, on Jul. 9, 2013, 9 pages.

\* cited by examiner

METHODS AND APPARATUS TO AVOID TRANSMISSION OF REDUNDANT NEIGHBOR CELL INFORMATION TO MOBILE STATIONS

FIELD OF THE DISCLOSURE

This disclosure relates generally to neighbor cell information processing and, more particularly, to methods and apparatus to avoid transmission of redundant neighbor cell information to mobile stations.

BACKGROUND

Neighbor cell information is used to facilitate mobility in many types of communication systems, such as a communication system compliant with the GSM/EDGE radio access network (GERAN) specifications (where GSM refers to "global system for mobile communications" and EDGE refers to "enhanced data rates for GSM evolution"). In a GERAN communication system, network cell system information is used by a mobile station to perform mobility procedures including, but not limited to, cell reselection and delayed call re-establishment. For example, in some cell reselection operating modes, such as when network assisted cell change (NACC) is enabled, the mobile station's serving cell provides the mobile station with neighbor cell system information for the target neighbor cell (or potential target cell or cells) of the reselection procedure. The mobile station can then use this neighbor cell system information to access the target neighbor cell directly upon reselection, without having to first receive messages broadcast in the target cell containing the target cell's system information. However, in a conventional implementation, after reselection is triggered, the network typically provides and the mobile station typically waits to receive a sufficient set of neighbor cell system information before concluding the reselection procedure to acquire the target neighbor cell.

In a GERAN communication system supporting call re-establishment, a mobile station experiencing a radio link failure during a call can re-establish the call with a neighbor cell without user intervention, provided the mobile station can acquire and establish a connection with the target neighbor call within a specified time period. However, in a conventional implementation, the mobile station typically waits to receive some or all of the system information broadcast by the target neighbor cell before initiating call re-establishment. The time taken to receive the target cell's broadcast system information can consume a significant amount of the specified completion time period and, thus, impact whether call re-establishment can be completed successfully. Reselection and call re-establishment are but two examples of mobility procedures in which a mobile station in a conventional GERAN system typically waits to receive sufficient neighbor cell system information from a serving cell or the neighbor cell itself before concluding the mobility procedure.

BRIEF DESCRIPTION OF THE DRAWINGS

FIG. 9 is a block diagram of an example network element, such as a base station controller, that could be used to implement a part of the communication system of FIG. 1.

DETAILED DESCRIPTION

Figure 1:
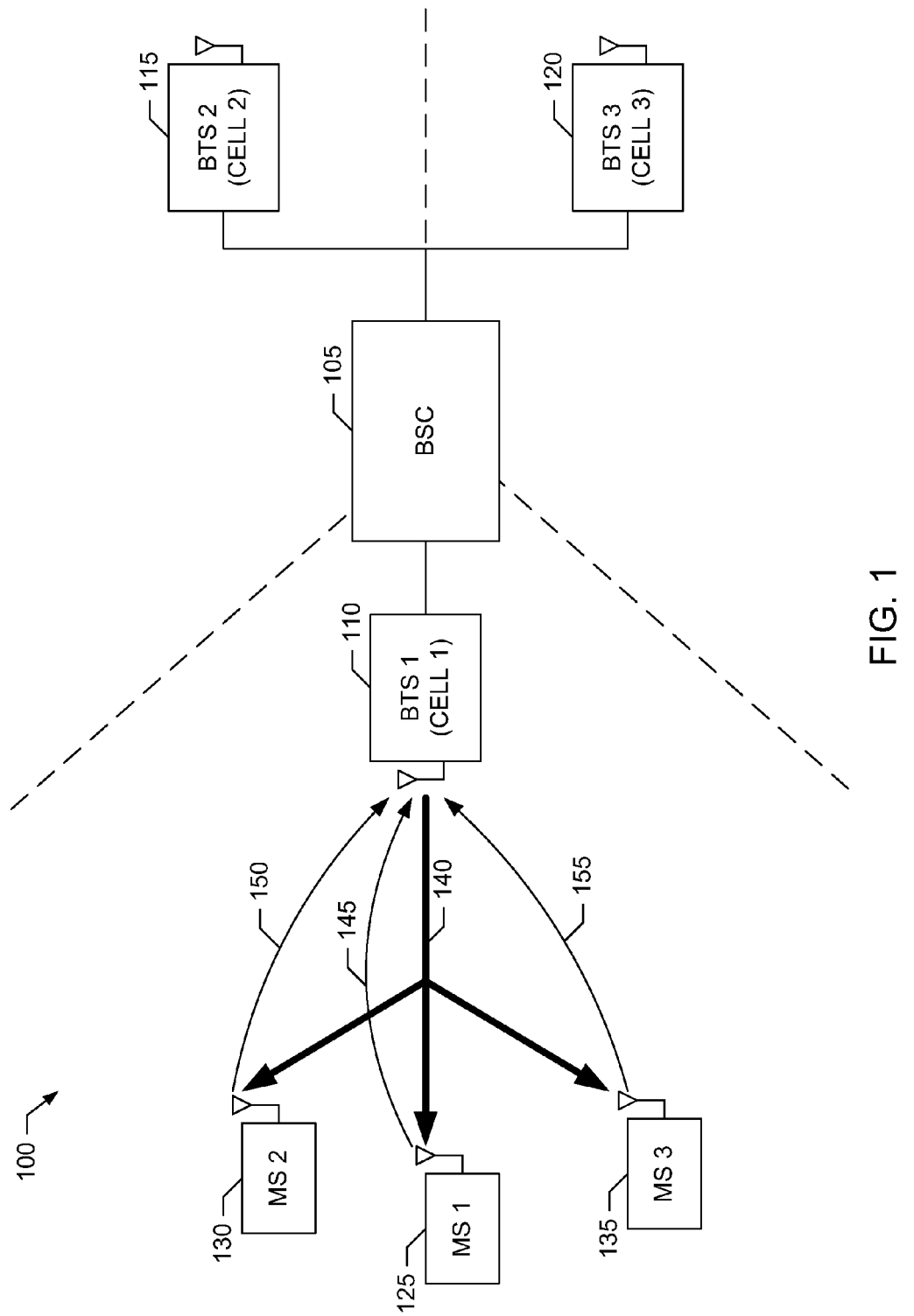
FIG. 1 is a block diagram of an example communication system supporting neighbor cell information processing according to the methods and apparatus described herein.

Methods and apparatus to monitor a channel to determine neighbor cell information are disclosed herein. An example technique described herein for a first mobile station to determine cell information for a first cell involves the first mobile station monitoring a channel for messages containing cell information. This example technique also involves receiving a first message including first cell information via the monitored channel, but with the first message addressed to a second mobile station. In an example implementation, the first mobile station stores the first cell information for a time period after receiving the first message.

Methods and apparatus to use such determined neighbor cell information, or other obtained neighbor cell information, or both, to avoid transmission of redundant neighbor cell information to mobile stations are also disclosed herein. A first example technique to avoid transmission of redundant neighbor cell information from a network to a mobile station involves the mobile station setting a validity indication representing whether the mobile station has valid neighbor cell information associated with a neighbor cell. This example technique also involves the mobile station sending the validity indication to the network to indicate whether the network can omit subsequent sending of at least a portion of the neighbor cell information associated with the neighbor cell to the mobile station.

A second example technique to avoid transmission of redundant neighbor cell information from a network to a mobile station involves the network receiving a validity indication from the mobile station representing whether the mobile station has valid neighbor cell information associated with a neighbor cell. This example technique also involves the network determining whether to schedule sending of the neighbor cell information associated with the neighbor cell to the mobile station based on the received validity indication.

As described in greater detail below, in a particular example implementation of any of the preceding techniques, a mobile station can obtain neighbor cell information by monitoring for messages addressed to itself and other mobile stations conveyed via a channel, such as a shared channel, a multiplexed channel, a channel accessible by multiple mobile stations or, in other words, via which data packets can be addressed to particular mobile stations, etc. For example, in a GERAN communication system, the mobile station can monitor a packet associated control channel (PACCH) for messages containing or otherwise related to the provisioning of neighbor cell information, such as packet neighbor cell data (PNCD) messages, packet cell change continue (PCCC) messages, packet cell change order (PCCO) messages, or packet switched handover (PSHO) messages. Additionally, in such a GERAN communication system, the mobile station can send measurement reports to the network containing system information validity indications in the form of one or more bits or bitmaps to inform the network that the mobile station has valid stored neighbor cell system information for one or more neighbor cells. The valid stored neighbor cell system information can be obtained by monitoring the PACCH for PNCD messages containing neighbor cell system information, by receiving system information messages broadcast by the neighbor cell(s), from any other source, etc., or any combination thereof. Upon receiving such system information validity indications, the network can determine whether it can omit sending at least some of the neighbor cell information to the mobile station because such information would be redundant with the valid neighbor cell information already stored in the mobile station.

As described in greater detail below, GERAN communication systems, mobile stations and network elements implementing the example techniques described herein can exhibit substantial benefits over conventional GERAN communication systems, mobile stations and network elements. For example, in conventional GERAN systems, a mobile station is unable to receive, store and use neighbor cell information specifically addressed to another mobile station. In contrast, in a GERAN communication system implementing the example techniques described herein, a mobile station is able to receive, store and use neighbor cell information even if such information is addressed to another mobile station. Additionally, in at least some cell reselection scenarios, a conventional GERAN network typically sends complete neighbor cell information for one or more neighbor cells to a mobile station, even if some or all of this neighbor cell information is already stored in the mobile station. In contrast, a GERAN communication system implementing the example techniques described herein enable the GERAN network to avoid sending such redundant neighbor cell information. As such, the benefits associated with the example techniques described herein can include, but are not limited to, reducing the radio resources consumed by sending redundant neighbor cell information, reducing the time spent completing cell reselection, reducing the time spent re-establishing a call experiencing a radio link failure when call re-establishment is enabled, increasing the likelihood the call re-establishment will be successful, etc.

Turning to the figures, a block diagram of an example GERAN communication system 100 capable of supporting the neighbor cell information processing techniques described herein is illustrated in FIG. 1. The GERAN system 100 includes a base station controller (BSC) 105 in communication with three base station transceivers (BTSs) 110, 115 and 120 implementing three respective cells: cell 1, cell 2 and cell 3. Additionally, the BTS 110 implementing cell 1 in the illustrated example is in communication with three mobile stations (MSs) 125, 130 and 135. As described in greater detail below, the BSC 105 (e.g., possibly in conjunction with the BTSs 110-120) and one or more of the MSs 125-135 implement the example techniques to monitor channels to determine neighbor cell information. Additionally or alternatively, the BSC 105 (e.g., possibly in conjunction with the BTSs 110-120) and one or more of the MSs 125-135 implement the example techniques to avoid transmission of redundant neighbor cell information to mobile stations described herein.

In the GERAN system 100 of FIG. 1, the mobile station 105 may be implemented by any type of mobile station or user endpoint equipment, such as a mobile telephone device, a mobile telephone device implementing a stationary telephone, a personal digital assistant (PDA), etc. Additionally, although each BTS 110, 115 and 120 implements a respective cell in the illustrated example, one or more of the BTSs 110, 115 and 120 could be configured to implement multiple cells. Furthermore, although only one BSC 105, three BTSs 110-120 and three MSs 125-135 are illustrated in FIG. 1, the GERAN system 100 can support any number of BSCs, BTSs and MSs. For example, the GERAN system 100 can support multiple BSCs in communication with each other and capable of exchanging neighbor cell system information.

In the illustrated example of FIG. 1, the MSs 125-135 are each operating in a mode supporting packet data communications. As such, the BSC 105 and the BTS 110 of the GERAN system 100 have allocated a PACCH channel 140 to convey downlink messages to one or more of the MSs 125-135. The PACCH channel 140 is configured to convey distribution messages broadcast to one or more of the MSs 125-135, and non-distribution messages addressed to a particular one of the MSs 125-135. Generally, each MS 125-135 is permitted to retain and use any distribution (e.g., broadcast) message conveyed via a PACCH 140 to which it is allocated. However, unless explicitly permitted, a particular MS 125-135 is permitted to retain and use only those non-distribution (e.g., non-broadcast) messages conveyed via the PACCH 140 that are specifically addressed to the particular MS 125-135. In other words, a particular MS 125-135 is to discard any non-distribution (e.g., non-broadcast) information conveyed via the PACCH 140 after determining the message is not specifically addressed to the MS 125-135.

The GERAN system 100 uses the PACCH 140 to convey, among other things, neighbor cell information to the MSs 125-135 to facilitate various mobility procedures. For example, cell 1 (implemented by BTS 110) can use the PACCH 140 to convey messages, such as non-distribution PNCD messages defined in the GERAN specifications, to any, some or all of the MSs 125-135 containing neighbor cell information for any or all of cell 2 (implemented by BTS 115)

or cell 3 (implemented by BTS 120). Such neighbor cell information can take the form of one or more system information (SI) messages, such as SI messages SI-1, SI-3 and SI-13 defined in the GERAN specifications, associated with each respective neighbor cell. Conventionally, because a PNCD message containing neighbor cell information (e.g., SI messages) is a non-distribution message, only the MS 125-135 to which the PNCD message is addressed can retain the included neighbor cell information (e.g., PNCD messages determined to be addressed to another MS are to be discarded). However, in the GERAN system 100 implementing the example techniques to monitor channels for neighbor cell information described herein, a particular MS 125-135 can also retain neighbor cell information included in PNCD messages conveyed via the PACCH 140 but addressed to other of the MSs 125-135.

Other messages related to the provisioning of neighbor cell information that can be conveyed via the PACCH 140 include PCCC messages, PCCO messages and PSHO command messages, as defined in the GERAN specifications. Processing of PNCD, PCCC, PCCO and PSHO messages, as well as other messages, conveyed via the PACCH 140 is described in greater detail below.

To support uplink communications from the MSs 125, 130 and 135, the GERAN system 100 includes respective uplink channels 145, 150 and 155. The uplink channels 145, 150 and 155 can be implemented by any type of channel, such as one or more shared (common) channel or channels, one or multiplexed channels, one or more dedicated channel or channels, or any combination thereof. As described in greater detail below, in the GERAN system 100 implementing the example techniques to avoid transmission of redundant neighbor cell information described herein, a particular MS 125-135 can use its respective uplink channel 145-155 to send a validity indication to the network (e.g., to cell 1 as implemented by the BTS 110 and BSC 105) to indicate what, if any, neighbor cell information (e.g. in the form of SI messages or their contents) is already stored in the particular MS 125-135. Such stored neighbor cell information can be obtained by monitoring distribution or non-distribution messages on the PACCH 140 as described in greater detail below, by receiving broadcast messages from one or more neighbor cells, or by other techniques, etc., or any combination thereof. The network can then use the received validity indication according to the example techniques described below to determine whether to schedule subsequent sending of any, some or all of the neighbor cell information associated with any, some or all of the neighbor cells (e.g., cells 2 or 3, or both) to the particular MS 125-135 (e.g., via one or more PNCD messages conveyed via the PACCH 140).

For brevity and clarity, operation of the GERAN system 100 to implement the example techniques to monitor channels for neighbor cell information and the example techniques to avoid transmission of redundant neighbor cell information are described from the perspective of the MS 125 operating in cell 1 as implemented by the BTS 110 in conjunction with the BSC 105. However, it can be readily appreciated that these example techniques can be implemented by any of the MSs 125-135 operating in any of the cells implemented by any of the BTSs 110-120 in conjunction with the BSC 105 and possibly other BSCs (not shown). Furthermore, although the example techniques to monitor channels for neighbor cell information and the example techniques to avoid transmission of redundant neighbor cell information are described in the context of the GERAN system 100 of FIG. 1, these example techniques can be readily adapted for use in any communication system in which neighbor cell information is conveyed via a channel.

Figure 2:
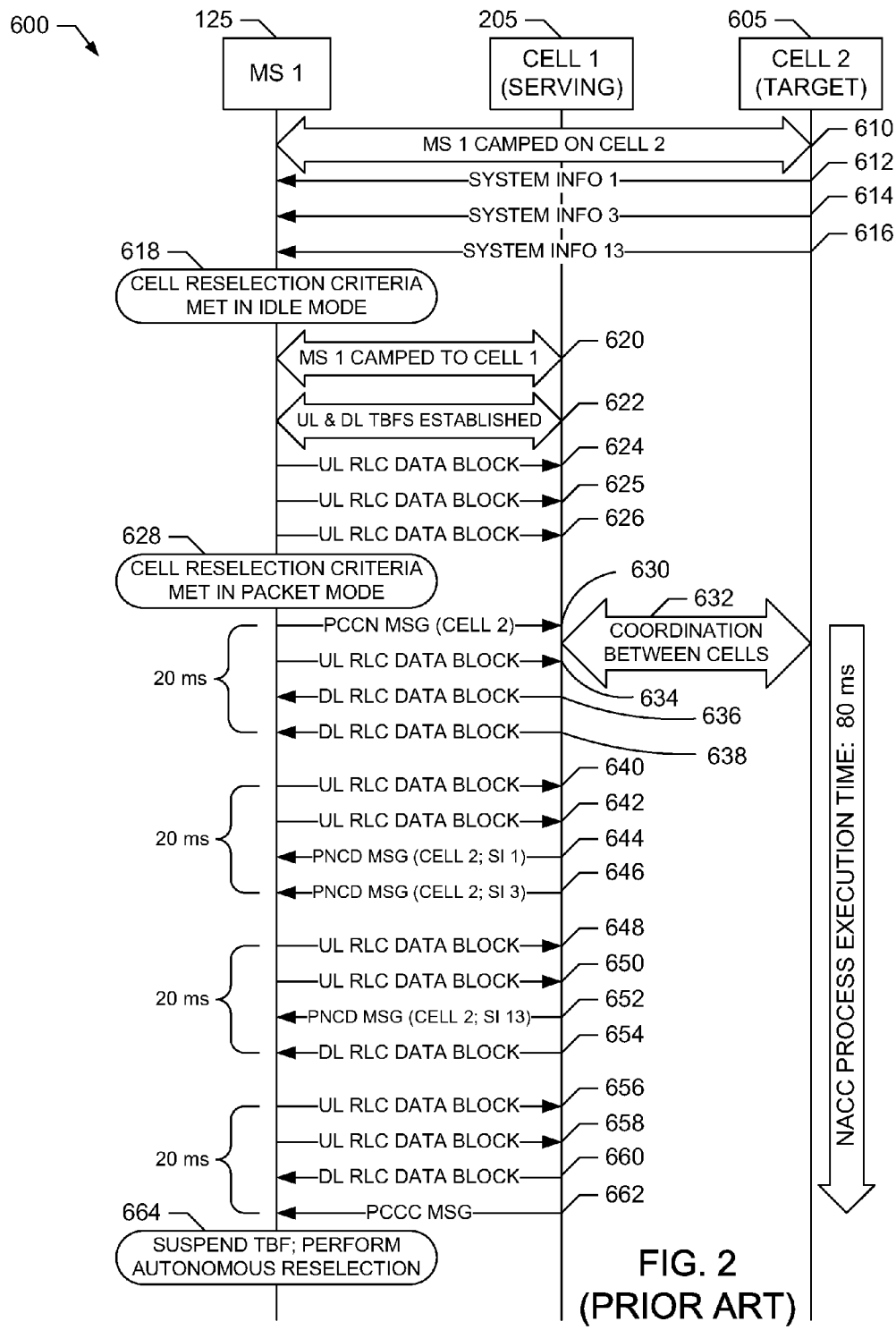
FIG. 2 is a message sequence diagram illustrating a prior art cell reselection procedure involving network assisted cell change (NACC) that could be performed by the communication system of FIG. 1.

To provide context for the example techniques to monitor channels for neighbor cell information and the example techniques to avoid transmission of redundant neighbor cell information described herein, a prior art cell reselection operation that could be implemented in the GERAN system 100 is illustrated in the message sequence diagram of FIG. 2. In particular, FIG. 2 illustrates a prior art cell reselection operation in which network assisted cell change (NACC) is enabled.

As defined in the GERAN specifications, there are three possible network control modes, NC0, NC1 and NC2, under which cell reselection can be performed. From the perspective of the MS 125 operating in cell 1 of the GERAN system 100 as implemented by the BTS 110 in conjunction with the BSC 105, NC0 mode corresponds to a completely autonomous mode in which cell reselection is performed autonomously by the MS 125 (e.g., with the MS 125 selecting the target neighbor cell for reselection without providing any measurement reports to the network). NC1 mode corresponds to a partially autonomous mode in which autonomous cell reselection by the MS 125 is permitted, and the MS 125 is to also send measurement reports to the network. Conversely, in NC2 mode, the network controls cell reselection and selects the target neighbor cell based on measurement reports sent by the MS 125. In general, autonomous reselection by the MS 125 is not permitted in NC2 mode. The network control modes NC0, NC1 and NC2 are applicable to the MS 125 when operating in a packet transfer mode or an idle mode.

Additionally, in the NC0 and NC1 modes, NACC may be enabled for a particular MS, such as the MS 125. NACC includes two aspects: cell change notification (CCN) performed by the MS, and distribution of neighbor cell information by the network. These may be used independently of each other. For example, if the CCN aspect of NACC is enabled, the MS 125 is to use a packet cell change notification (PCCN) message to inform the network when autonomous reselection to a particular target neighbor cell is possible (e.g., such as when one or more autonomous reselection criteria are met). When the PCCN message is received from the MS 125 by the network, the network can respond by providing the MS 125 with neighbor cell system information for the proposed target cell included in the received PCCN message. Alternatively, the network can provide neighbor cell system information for another neighbor cell if the network decides to override the proposed target cell indicated in the received PCCN message. Such neighbor cell system information can be provided by the network using one or more PNCD messages conveyed to the MS 125 via the PACCH 140. Additionally, after having received a PCCN, the network can determine to complete sending any ongoing data packets to the MS 125 before sending a PCCC message to the MS 125 confirming the proposed target cell or sending a PCCO message instructing the MS 125 to perform reselection to the same or another specified target cell.

NACC enables the network to provide neighbor cell system information for a cell reselection target cell to the MS 125 typically faster than the MS 125 could obtain this information by receiving and processing SI messages broadcast by the target sell itself. As mentioned above, after reselection is triggered but prior to concluding reselection to acquire the target cell, the serving cell (e.g., cell 1) in communication with the MS 125 sends the target cell's system information to the MS 125 using one or more PNCD messages conveyed via the PACCH 140. The PNCD messages are then followed by a PCCC or PCCO message, as appropriate. The network also conveys target neighbor cell system information to the MS 125 via one or more PNCD messages when a packet switched handover is to be performed. As such, PNCD messages can be used to convey neighbor cell system information to the MS 125 in NC0, NC1 or NC2 mode.

Turning to FIG. 2, the message sequence diagram 600 illustrates messages that could be exchanged between the MS 125 and cells 1 and 2 of the GERAN network 100 if configured to implement a prior art cell reselection operation in which NACC is enabled. In FIG. 2, cell 1, as implemented by the BSC 105 and the BTS 110, is represented by block 205, and cell 2, as implemented by the BSC 105 and the BTS 115, is represented by block 605. The illustrated message sequence diagram 600 begins with the MS 125 being in idle mode and camped on cell 2 (represented by the hollow directed line 610). Because the MS 125 is camped on cell 2, the MS 125 is able to receive system information messages 612, 614 and 616 corresponding, respectively, to SI messages SI-1, SI-3 and SI-13 being broadcast by cell 2.

Next, at block 618 the MS 125 performs cell reselection to cell 1. As a result, MS 125 then camps on cell 1 (represented by the hollow directed line 620) and, thus, cell 1 becomes the serving cell for the MS 125. Sometime later, an uplink (UL) temporary block flow (TBF) and a downlink (DL) TBF are established between the MS 125 and cell 1 (represented by the hollow directed line 622) and the MS 125 transitions from idle mode to packet transfer mode (PTM) in which packet data traffic can be exchanged with the network. A TBF (uplink or downlink) is a temporary connection established between the MS 125 and cell 1 to allow radio link control (RLC) and medium access control (MAC) packet data to be exchanged between the MS 125 and cell 1 over an allocated channel. An uplink TBF conveys uplink RLC/MAC data from the MS 125 to the network (e.g., cell 1), and a downlink TBF conveys RLC/MAC data from the network (e.g., cell 1) to the MS 125. A particular TBF is identified using a temporary flow indicator (TFI) that uniquely identifies the TBF among those TBFs in the same direction and using the same timeslot(s) or, in other words, using the same packet data channel(s) (PDCH (s)). For example, in a GERAN-compliant system, a PDCH is associated with a particular radio timeslot index, and a TBF may be implemented using one or more PDCHs. For example, in a basic transmission time interval (BTTI) configuration, a TBF may be implemented using a single PDCH and, thus, be associated with a single timeslot index. However, in a reduced transmission time interval (RTTI) configuration, a TBF may be implemented using one or more pairs of PDCHs and, thus, be associated with one or more corresponding pairs of timeslot indices. Generally, a TFI value for a particular TBF is assumed to be unique among the concurrent TBFs operating in the same direction (i.e., uplink or downlink) and on the PDCH(s) used to implement the particular TBF. However, the same TFI value may be used to identify other TBFs operating in the same direction but implemented using other PDCHs, or to identify other TBFs operating in the opposite direction. As such, the TFI can be used to address RLC/MAC data packets conveyed using the associated TBF to a particular endpoint (e.g., the MS 125 of cell 1).

After the uplink TBF is established, the MS 125 is able to send UL RLC/MAC data blocks 624-626 to cell 1. Similarly, after the downlink TBF is established, cell 1 is able to send DL RLC/MAC data blocks (not shown) to the MS 125. Sometime later, the MS 125 triggers autonomous reselection in response to detecting one or more autonomous reselection criteria (block 628). Next, the MS 125 sends a PCCN message 630 to cell 1 (its serving cell) to indicate that the criteria autonomous reselection are met. Furthermore, the MS 125 indicates in the PCCN message 630 that cell 2 is the proposed target neighbor cell. Because NACC is enabled, receipt of the PCCN message 630 may cause cell 1 to coordinate with cell 2 (e.g., via the BSC 105) to obtain neighbor cell system information for cell 2 (represented by the hollow directed line 632), if such information is not already available. UL and DL RLC/MAC data blocks 634-642 continue to be exchanged between the MS 125 and cell 1 until the cell is ready to convey the neighbor cell system information for cell 2 to the MS 125.

In the message sequence diagram 600 of FIG. 2, cell 1 is able to begin sending PNCD messages containing neighbor cell information for cell 2 to the MS 125 in the next radio block period after receiving the PCCN message 630. Here, two UL slots and two DL slots have been allocated for communications between the MS 125 and cell 1. Accordingly, cell 1 is able to send only two PNCD messages 644 and 646 in the radio block period following receipt of the PCCN message 630. As shown, the PNCD messages 644 and 646 are used to convey SI messages SI-1 and SI-3, respectively, for cell 2 (the proposed target cell identified in the PCCN message 630). UL RLC/MAC data blocks 648-650 are then exchanged in the next radio block period, followed by cell 1 being able to finish sending the neighbor cell information for cell 2 by sending a PNCD message 652 containing SI message SI-13 for cell 2. Cell 1 can use the other allocated DL slot to send another DL RLC/MAC data block 654 to the MS 125. As described in greater detail below, although SI messages are shown in FIG. 2 as being contained completely in respective PNCD messages, SI messages may be larger than, smaller than or equal to the payload capacity of a PNCD message.

In the next radio block period, the MS 125 is able to send UL RLC/MAC data blocks 656-658 in its two allocated UL slots. In the corresponding DL slots, cell 1 sends a DL RLC/MAC data block 660 followed by a PCCC message 662. As described above, the PCCC message 662 indicates that the MS 125 can perform reselection to the proposed target cell (e.g., cell 2 in FIG. 2). Alternatively, instead of sending the PCCC message 662, cell 1 could decide to send (i) a PCCO message to specify a cell reselection target cell different from the proposed target neighbor cell identified in the PCCN message 630, (ii) a PCCO message to provide further information specifying the behavior of the MS 125 in the proposed target neighbor cell identified in the PCCN message 630, (iii) a PSHO command message to indicate that the MS 125 is to perform packet switched handover to a specified target cell that may be the same as or different from the proposed target neighbor cell identified in the PCCN message 630 (e.g., to reduce service interruption), etc. Returning to FIG. 2, in response to receiving the PCCC message 662, the MS 125 suspends the TBF with cell 1 and performs autonomous reselection to cell 2 (block 664). As shown in FIG. 2, the NACC processing time from initially sending the PCCN message 630 through receipt of the PCCC message 662 is approximately 80 milliseconds (ms). The message sequence diagram 600 then ends.

Given the context provided by the prior art cell reselection operation illustrated in FIG. 2, the example techniques to monitor channels for neighbor cell information disclosed herein and their potential benefits are now described. For example, in the message sequence diagram 600 of FIG. 2, cell 1 sends all of the PNCD messages 644, 646 and 652 to the MS 125 to convey complete neighbor cell information for cell 2 (e.g., in the form of all of the SI messages SI-1, SI-3 and SI-13) regardless of whether the MS 125 already has this neighbor cell information. For example, if less than a certain time period, such as thirty (30) seconds, has elapsed since some or all of the system messages 612-616 were received, the MS 125 may still have some or all of the SI messages SI-1, SI-3 and SI-13 for cell 2 stored in memory. In such an example, some or all of the PNCD messages 644, 646 and 652 containing these same SI messages may be redundant and, thus, unnecessary. Additionally or alternatively, the example techniques to monitor channels for neighbor cell information described herein can be used by the MS 125 to obtain neighbor cell information for cell 2, thereby also making some or all of the PNCD messages 644, 646 and 652 containing this same neighbor cell information redundant and, thus, unnecessary. By taking advantage of neighbor cell information already stored in the MS 125, some or all of the PNCD messages 644, 646 and 652 can be omitted, resulting in a potential saving of radio resources or reduction in the delay before a mobility procedure can be completed, or both.

Figure 3:
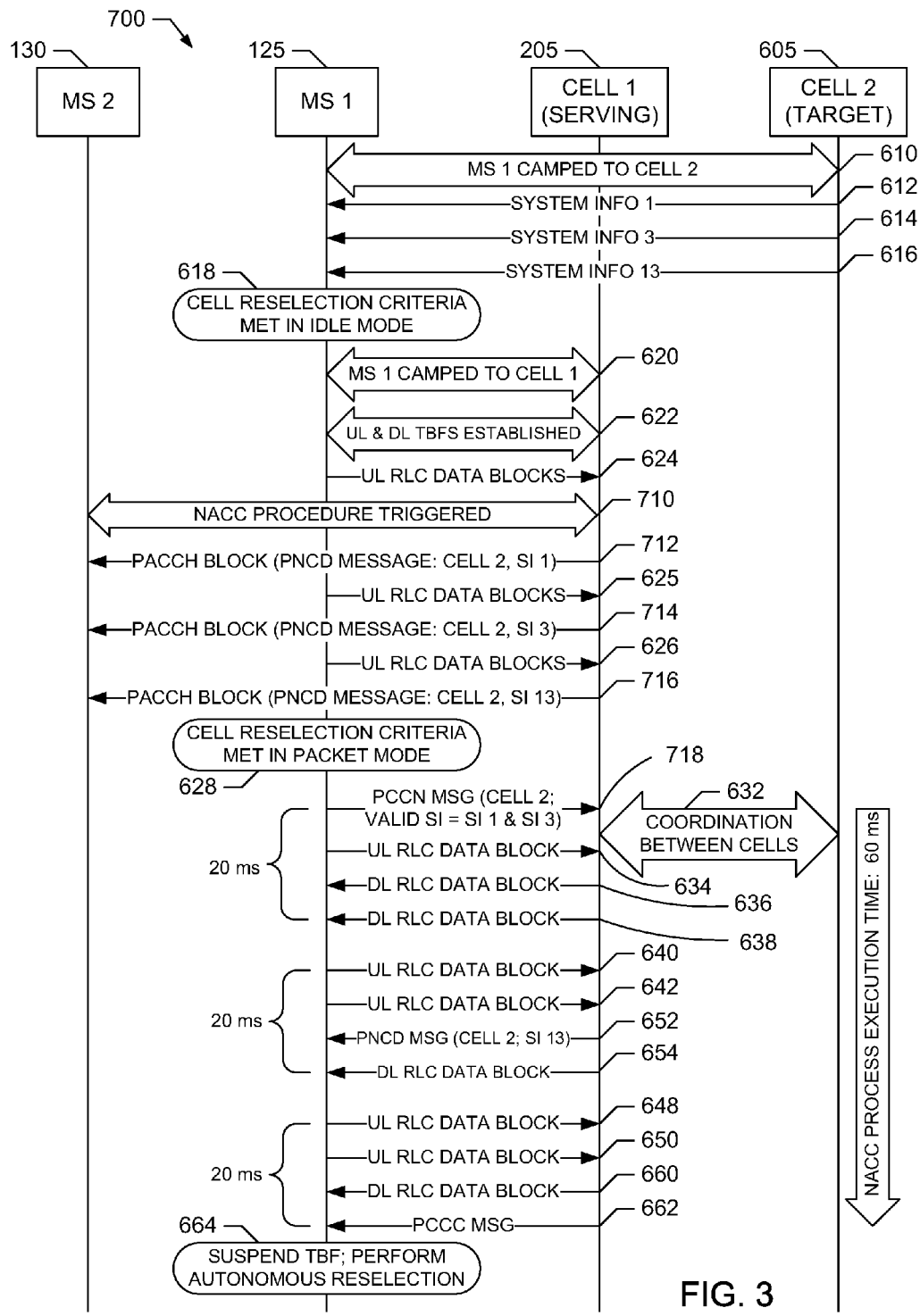
FIG. 3 is a message sequence diagram illustrating example channel monitoring for neighbor cell information and subsequent avoidance of transmission of redundant neighbor cell information that can be used in a cell reselection procedure performed by the communication system of FIG. 1.

With the foregoing in mind, a message sequence diagram 700 illustrating an example technique to monitor channels for neighbor cell information and an example technique to avoid transmission of redundant neighbor cell information implemented according to the methods and apparatus described herein is provided in FIG. 3. For clarity, like elements in FIGS. 1-3 are labeled with the same reference numerals. Detailed descriptions of these like elements are provided above in connection with FIG. 2. Also, in FIG. 3, as in the preceding figure, cell 1, as implemented by the BSC 105 and the BTS 110, is represented by block 205, and cell 2, as implemented by the BSC 105 and the BTS 115, is represented by block 605. FIG. 3 further includes the MS 125 and MS 130 of the GERAN system 100 of FIG. 1.

Turning to FIG. 3, operation of the message sequence diagram 700 from MS 125 being in idle mode and camped on cell 2 (represented by the hollow directed line 610), to reselecting to and camping on cell 1 (represented by the hollow directed lines 618 and 620), then to establishing the UL (as well as DL) TBF (represented by the hollow directed line 622), and then exchanging UL RLC/MAC data blocks 624-626 is substantially similar to the example message sequence diagram 600 of FIG. 2. Accordingly, this portion of the message sequence diagram 700 is not repeated for brevity.

Unlike the prior art operation illustrated in FIG. 2, the message sequence diagram 700 illustrates an example operation of the MS 125 to monitor channels for neighbor cell information as disclosed herein. As such, in addition to establishing the UL TBF (represented by the hollow directed line 622) and exchanging UL RLC/MAC data blocks 624-626, the MS 125 is also able to monitor channels conveying neighbor cell information to other MSs operating in the GERAN system 100. For example, in the illustrated example and unlike the prior art, the MS 125 is configured to monitor PACCH channels, such as the PACCH 140, for non-distribution messages, such as PNCD messages, conveying neighbor cell information to other MSs, such as the MS 130. Such configuration may be implicit in which the MS 125 automatically monitors the PACCH 140 (e.g., whenever the PACCH 140 is available, based on MS operating mode, etc.), or explicit in which the network may send one or more messages to authorize the MS 125 to monitor the PACCH 140.

For example, in the message sequence diagram 700, the MS 130 is also camped on cell 1 and then initiates cell reselection identifying cell 2 as the proposed target cell. This triggers a NACC procedure between the MS 130 and cell 2 (represented by the directed line 710). Because NACC is triggered, cell 1 begins sending neighbor cell system information for cell 2 to the MS 130. In the illustrated example, cell 1 sends three PNCD messages 712, 714 and 716 via the PACCH 140 to the MS 130 to convey SI messages SI-1, SI-3 and SI-13, respectively, for cell 2 (the proposed target cell identified by the MS 130 when the NACC procedure was triggered). Although the PNCD messages 712, 714 and 716 are non-distribution messages addressed specifically to the MS 130 (e.g., using a TFI corresponding to a TBF assigned to the MS 130), the GERAN system 100 permits monitoring of non-distribution messages containing neighbor cell information. Accordingly, the MS 125 in the illustrated example is configured to monitor the PACCH channel 140 for PNCD messages sent to itself or to other mobile stations (e.g., corresponding to PNCD messages having TFI(s) different than the TFI(s) identifying TBF(s) assigned to the MS 125), such as the PNCD messages 712, 714 and 716 sent via the PACCH 140 to the MS 130. By monitoring the PACCH 140 and receiving some or all of the PNCD messages 712, 714 and 716, the MS 125 is able to obtain and store neighbor cell system information for cell 2 for subsequent use (e.g., such as during subsequent mobility procedures, call re-establishment, etc.).

In the message sequence diagram 700, after the PNCD messages 712, 714 and 716 are sent by cell 1 and monitored by the MS 125, the MS 125 triggers autonomous reselection in response to detecting one or more autonomous reselection criteria (block 628). After triggering autonomous reselection at block 628, the MS 125 sends a PCCN message 718 to cell 1 (its serving cell) to indicate that autonomous reselection is possible and to identify cell 2 as the proposed target neighbor cell. However, unlike in the prior art operation illustrated in FIG. 2, here the GERAN system 100 supports the example techniques to avoid sending redundant neighbor cell information described herein. As such, in addition to identifying cell 2 as the proposed target cell, the MS 125 is also configured to indicate to the network via the PCCN message 718 what, if any, neighbor cell information for cell 2 (the proposed target cell), and possibly other cells, is already stored and valid in the MS 125. For example, in the message sequence diagram 700, the MS 125 indicates via the PCCN message 718 that MS 125 is storing valid SI messages SI-1 and SI-3 for target neighbor cell 2. In the illustrated example, the MS 125 may have obtained the stored SI messages SI-1 and SI-3 by monitoring the PACCH channel 140 and receiving, storing and processing the PNCD messages 712 and 714 sent by cell 1 and addressed to MS 130. Additionally or alternatively, the MS 125 may still be storing the SI messages SI-1 and SI-3 obtained by receiving the system information messages 612 and 614 broadcast by cell 2, if a certain time period, such as thirty (30) seconds, during which system information can be stored before being discarded has not yet elapsed.

As in FIG. 2, in the illustrated example of FIG. 3, two UL slots and two DL slots have been allocated for communications between the MS 125 and cell 1. Thus, after sending the PCCN message 718, the MS 125 and cell 1 exchange UL and DL RLC/MAC data blocks 634-642 as shown. Then, cell 1 is able to begin sending PNCD messages containing neighbor cell information for cell 2 to the MS 125 in the next radio block period after receiving the PCCN message 718. However, unlike in the prior art operation illustrated in FIG. 2, here cell 1 is able to avoid sending redundant neighbor cell information to the MS 125 by omitting to send (or, in other words, not sending) PNCD messages containing valid neighbor cell information known to be stored in the MS 125. For example, in the message sequence diagram 700, cell 1 receives the validity indications included in the PCCN message 718 indicating that the MS 125 already is storing valid SI-1 and SI-3 messages for cell 2. Thus, the network can determine that sending the SI-1 and SI-3 messages to the MS 125 in response to the PCCN message 718 would be redundant and, thus, unnecessary for supporting the NACC procedure. Accordingly, in the message sequence diagram 700, cell 1 sends the PNCD message 652 containing the SI message SI-13 for cell 2 to the MS 125 because the MS 125 indicated (implicitly) via the PCCN message 718 that it did not have a valid SI-13 message stored for cell 2. But, cell 1 is able to omit sending the PNCD messages 644 and 646 used to convey SI messages SI-1 and SI-3, respectively, for cell 2 in the message sequence diagram 600 because cell 1 knows that these SI messages are already stored in the MS 125 and, thus, sending them again would be redundant. Cell 1 then uses the other allocated DL slot to send another DL RLC/MAC data block 654 to the MS 125.

In the next radio block period, the MS 125 is able to send UL RLC/MAC data blocks 648-650 in its two allocated UL slots. In the assigned/allocated DL slots, cell 1 sends the DL RLC/MAC data block 660 followed by the PCCC message 662. As described above, the PCCC message 662 indicates that the MS 125 can perform reselection to the proposed target cell (e.g., cell 2 in the illustrated example). In response to receiving the PCCC message 662, the MS 125 suspends the TBF with cell 1 and performs autonomous reselection to cell 2 (block 664). The example message sequence diagram 700 then ends.

As shown in FIG. 3, the NACC processing time from initially sending the PCCN message 718 through receipt of the PCCC message 662 is 60 ms. In contrast, the prior art example of FIG. 2 required 80 ms. from sending of the PCCN message 630 through receipt of the PCCC message 662. Therefore, the example techniques described herein enable cell reselection to be performed and concluded faster, in at least in some scenarios. Additionally, fewer radio resources (e.g., two less radio blocks of bandwidth) were consumed by the example of FIG. 3, relative to the prior art example of FIG. 2, to complete the cell reselection procedure.

Figure 4:
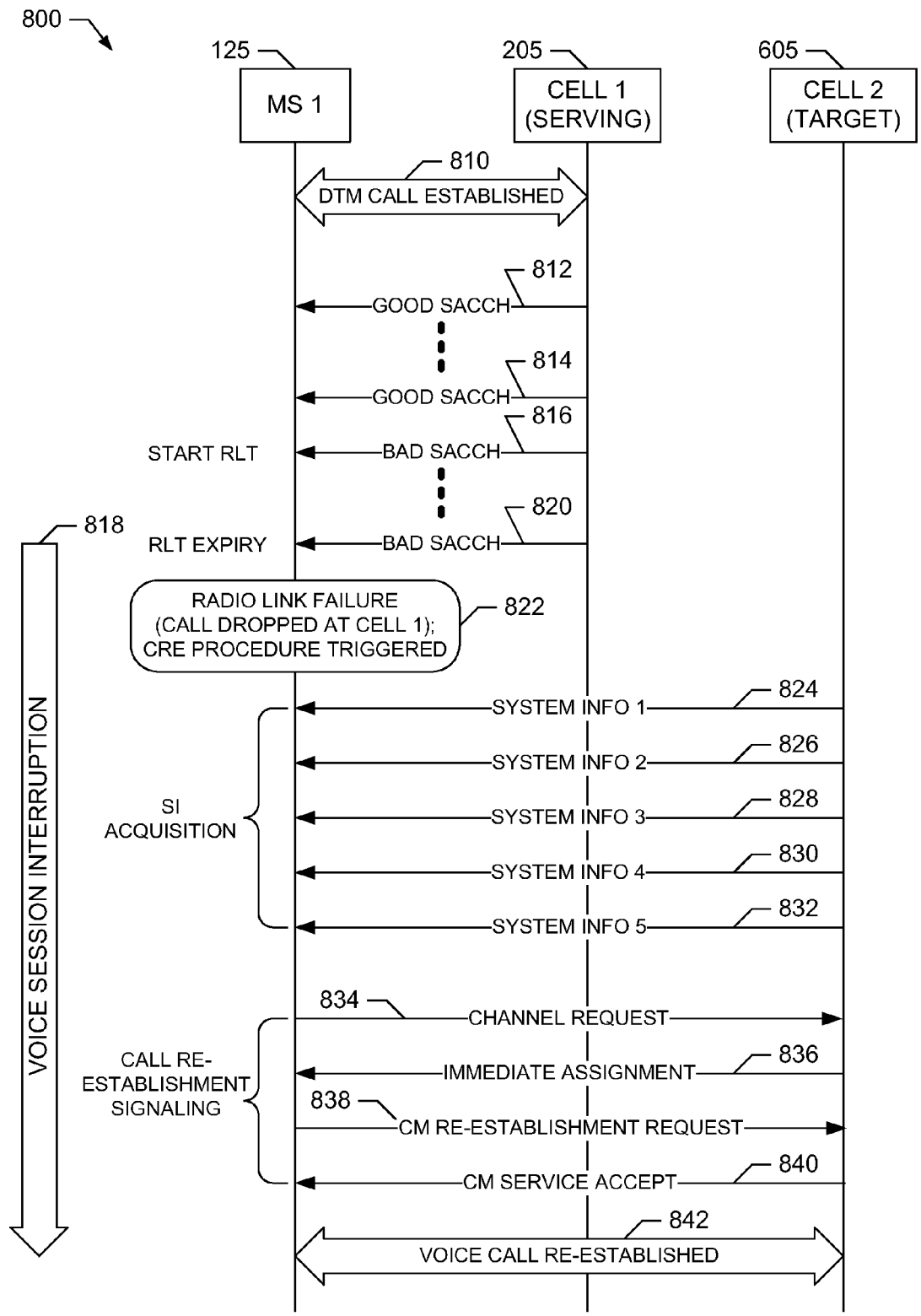
FIG. 4 is a message sequence diagram illustrating a prior art delayed call re-establishment procedure that could be performed by the communication system of FIG. 1.

To provide further context for the example techniques to monitor channels for neighbor cell information and the example techniques to avoid transmission of redundant neighbor cell information described herein, an example prior art CRE procedure that could be implemented in the GERAN system 100 is illustrated in the message sequence diagram 800 of FIG. 4. In FIG. 4, as in the preceding figures, cell 1, as implemented by the BSC 105 and the BTS 110, is represented by block 205, and cell 2, as implemented by the BSC 105 and the BTS 115, is represented by block 605. FIG. 4 further includes the MS 125 of the GERAN system 100 of FIG. 1.

As mentioned above, the CRE procedure allows an MS in a GERAN system to re-establish an existing call after experiencing a radio link failure without user intervention. In a conventional implementation, the MS performing the CRE procedure is to perform acquisition of system information of a target neighbor cell (if the system information is not already stored) before initiating call re-establishment signaling to re-establish the call with the target neighbor cell. Turning to FIG. 4, the message sequence diagram 800 begins with a dual transfer mode (DTM) call being established between the MS 125 and cell 1 (represented by the hollow directed line 810). A DTM call is a call supporting both packet switched traffic and circuit switched traffic (e.g., such as circuit switched voice communications). After the DTM call is established, the MS 125 detects valid slow associated control channel (SACCH) messages 812-814 broadcast by cell 1. By detecting the valid SACCH messages 812-814 during the DTM call, the MS 125 is able to determine that it still has a good radio link with cell 1.

Next, the MS 130 detects a bad SACCH message 816 (or fails to detect any SACCH message) corresponding to a potential radio link failure. In the illustrated example, the MS 125 continues to detect bad SACCH messages until a bad SACCH message 820 is detected. Detection of the bad SACCH message 820 corresponds to determination that the radio link has failed and also interruption of the voice session supported by the DTM (represented by the hollow directed line 818), although prior gaps in or corruption of the audio, or both, may occur before the voice session is completely interrupted. Thus, at block 822 the MS 125, having determined that a radio link failure has occurred, triggers the CRE procedure to attempt to re-establish the call.

Next, as part of the CRE procedure, the MS 125 begins receiving and acquiring system information for neighbor cells. For example, in the message sequence diagram 800, the MS 125 receives system information messages 824-832 broadcast by cell 2, which is a neighbor cell of cell 1. In addition, the MS 125 may receive and acquire system information for the serving cell (cell 1). After acquiring sufficient system information messages (e.g., such as the SI-1, SI-3 and SI-13) for cell 2, and determining that cell 2 is preferred over other neighbor cells supporting CRE, the MS 125 initiates call re-establishment signaling by sending a channel request message 834 to cell 2 via a random access channel (RACH). The channel request message 834 requests re-establishment of at least the voice component of the DTM call previously served by cell 1. Subsequent CRE signaling includes an immediate assignment message 836 sent from cell 2 to the MS 125, a connection management (CM) re-establishment request message 838 sent from the MS 125 to cell 2, and a CM service accept message 840 sent from cell 2 to the MS 125. After the CM service accept message 840 is received by the MS 125, the voice call is successfully re-established (represented by the hollow directed line 842) and the associated voice session is no longer interrupted.

Successful call re-establishment, such as that illustrated in FIG. 4, allows the MS 125 to re-establish a traffic channel and continue a call without user intervention (e.g., without the user manually re-dialing the call and waiting for the called party to answer). However, the network typically allots a limited (possibly configurable) time during which call re-establishment may be attempted, after which the call is dropped. Thus, reducing the time expended from the MS 125 detecting a radio link failure to sending the channel request message 834 to a new target cell (e.g., cell 2) improves the likelihood that call re-establishment will complete successfully during the allotted time. As shown in FIG. 4, receiving and processing the system information messages 824-832 for the target neighbor cell is a significant portion of this time. Reducing the time spent obtaining neighbor cell system information for target neighbor cells, therefore, can improve call re-establishment reliability, in at least some scenarios. Additionally, because the voice session is interrupted while the call is being re-established, reducing the time to re-establish the call can improve user-perceived audio quality by shortening the perceived gaps in audio while the call is being re-established, in at least some scenarios.

Figure 5:
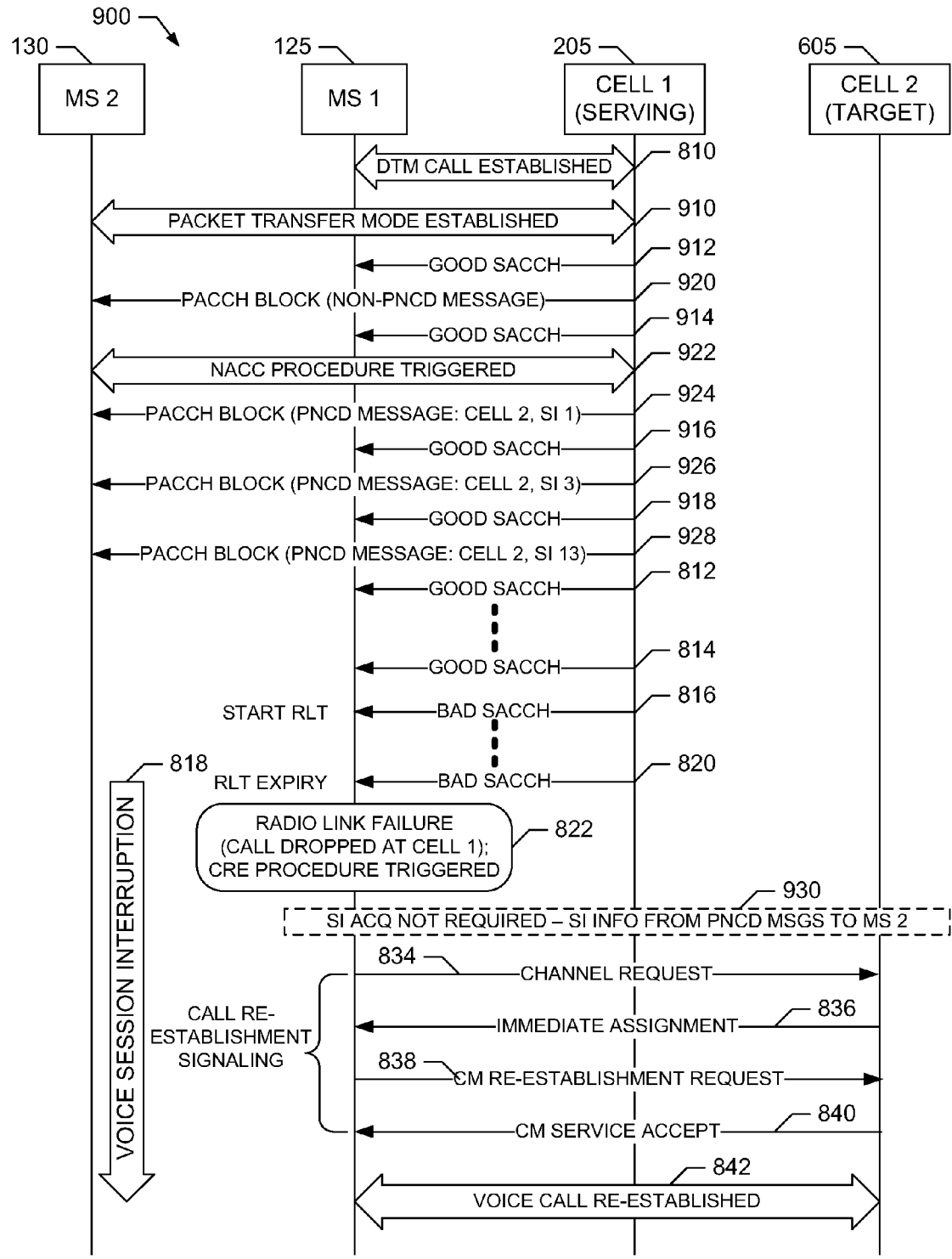
FIG. 5 is a message sequence diagram illustrating example channel monitoring to determine neighbor cell information for use in a delayed call re-establishment procedure performed by the communication system of FIG. 1.

With the foregoing in mind, a message sequence diagram 900 illustrating an example technique to monitor channels for neighbor cell information that can be used in a CRE procedure is provided in FIG. 5. For clarity, like elements in FIGS. 1, 4 and 5 are labeled with the same reference numerals. Detailed descriptions of these like elements are provided above in connection with FIG. 4. Also, in FIG. 5, as in the preceding figures, cell 1, as implemented by the BSC 105 and the BTS 110, is represented by block 205, and cell 2, as implemented by the BSC 105 and the BTS 115, is represented by block 605. FIG. 5 further includes the MS 125 and MS 130 of the GERAN system 100 of FIG. 1.

Turning to FIG. 5, the message sequence diagram 900 also begins with the DTM call being established between the MS 125 and cell 1 (represented by the hollow directed line 810). Additionally, a packet transfer mode for exchanging packet-switched traffic is established between the MS 130 and cell 1 (represented by the hollow directed line 910). Next, the MS 125 detects valid SACCH messages 910-918 broadcast by cell 1 during the DTM call. As described above, by detecting the valid SACCH messages 910-918 during the DTM call, the MS 125 is able to determine that it still has a good radio link with cell 1.

While the MS 125 is detecting the valid SACCH messages 910-918 during the DTM call, the MS 130 is exchanging packet transfer mode messages with cell 1, such as any non-PNCD message 920 conveyed via the PACCH 140. Then, the MS 130 initiates cell reselection identifying cell 2 as the proposed target cell. This triggers an NACC procedure between the MS 130 and cell 2 (represented by the directed line 922). Because NACC is triggered, cell 1 begins sending neighbor cell system information for cell 2 to the MS 130. In the illustrated example, cell 1 sends three PNCD messages 924, 926 and 928 via the PACCH 140 to the MS 130 to convey SI messages SI-1, SI-3 and SI-13, respectively, for cell 2 (the proposed target cell identified by the MS 130 when the NACC procedure was triggered). Although the PNCD messages 924, 926 and 928 are non-distribution messages addressed specifically to the MS 130 (e.g., using a TFI assigned to the MS 130), the GERAN system 100 permits monitoring of non-distribution messages containing neighbor cell information. Accordingly, the MS 125 in the illustrated example is configured to monitor the PACCH channel 140 for PNCD messages sent to itself or to other mobile stations (e.g., corresponding to PNCD messages having TFI(s) different than the TFI(s) identifying TBF(s) assigned to the MS 125), such as the PNCD messages 924, 926 and 928 sent via the PACCH 140 to the MS 130. By monitoring the PACCH 140 and receiving the PNCD messages 924, 926 and 928, the MS 125 is able to obtain and store neighbor cell system information for cell 2 that can be used during subsequent mobility procedures.

Next, operation of the message sequence diagram 900 continues as in the prior art example of FIG. 4 from the MS 125 detecting of the good SACCH 812 through the MS 125 determining a radio link failure has occurred and, thus, triggering the CRE procedure to re-establish the call (block 822). However, unlike the prior art example of FIG. 4, in the illustrated example of FIG. 5, the MS 125 has already obtained the neighbor cell information for cell 2 by monitoring the PACCH 140 and receiving, storing and processing the system information included in the PNCD messages 924-928 sent by cell 1 to the other mobile station 130. Thus, in the message sequence diagram 900 in which the MS 125 is configured to monitor channels for neighbor cell information as described herein, the MS 125 can forego expending the time and resources to receive and process the system information messages 824-832 broadcast by cell 2 in the prior art example of FIG. 4. Instead, the MS 125 uses the system information obtained from the PNCD messages 924-928 sent by cell 1 to the other mobile station 130 to initiate call re-establishment signaling (represented by the dashed box 930). Then, call re-establishment signaling of messages 834-840 continues as in the example of FIG. 4, culminating in the voice call being successfully re-established (represented by the hollow directed line 842) and the associated voice session no longer being interrupted. As depicted in FIG. 5, employing monitoring of channels for neighbor cell information as described herein can avoid having the MS 125 expend valuable time and resources to acquire neighbor cell information, potentially improving the likelihood of successful call re-establishment, as well as user-perceived audio quality in the form of reduced audio gaps during call re-establishment.

Figure 6:
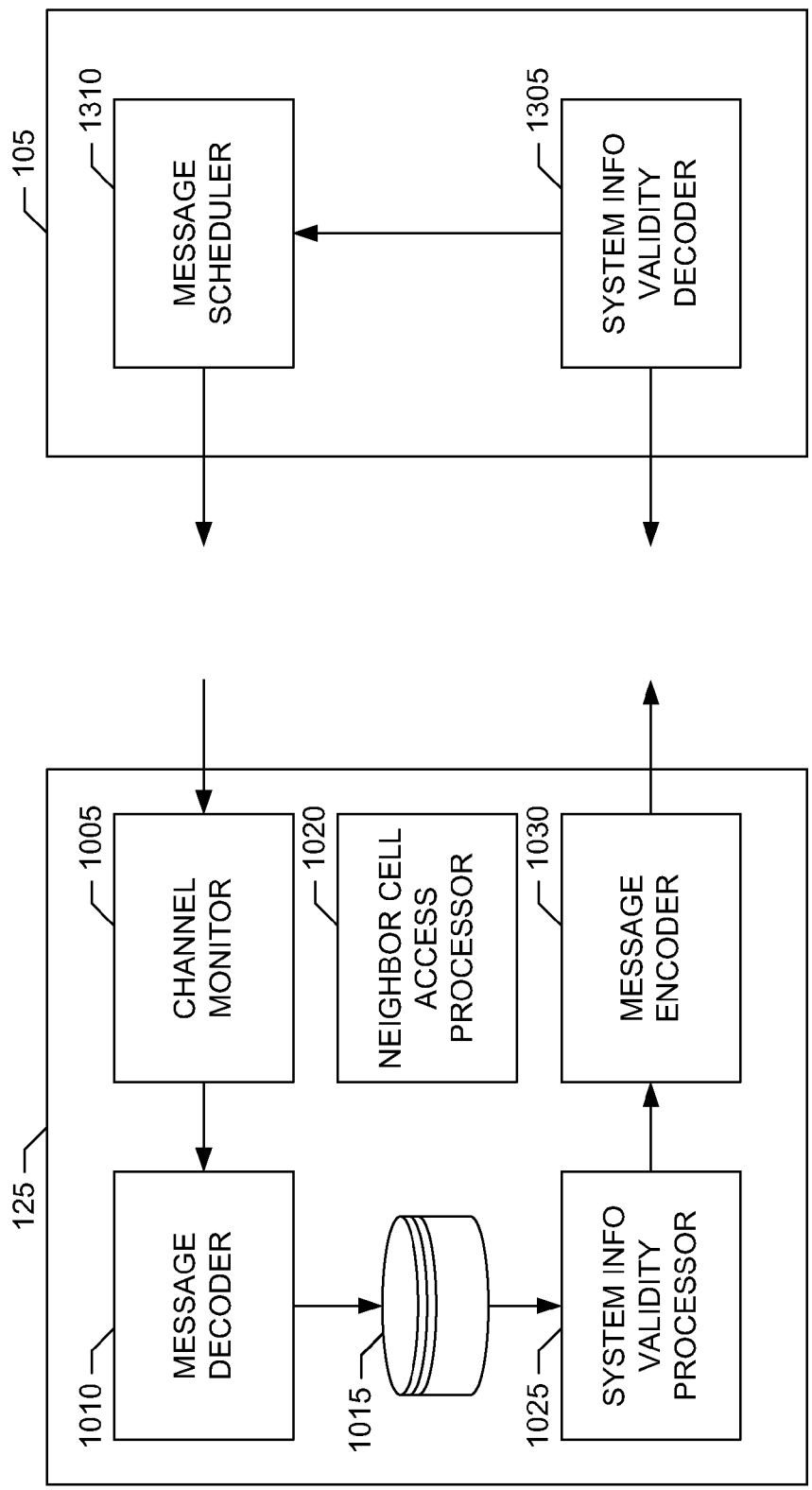
FIG. 6 is a block diagram of an example mobile station that could be used to implement a part of the communication system of FIG. 1.

A block diagram of an example implementation of the MS 125 of FIG. 1 is illustrated in FIG. 6. The example implementation illustrated in FIG. 6 could also be used to implement either or both of the MSs 130 and 135 of FIG. 1, but for brevity and clarity, FIG. 6 is described from the perspective of implementing the MS 125 of FIG. 1. Turning to FIG. 6, the illustrated example implementation of the MS 125 includes a channel monitor 1005 to monitor one or more communication channels for messages containing neighbor cell information. For example, when the MS 125 is operating in a packet switched (PS) or DTM mode, the MS 125 is configured to receive messages over a channel, such as the PACCH 140. The PACCH channel 140 is shared (e.g., multiplexed) with other MSs operating in PS or DTM modes, such as the MSs 130 and 135. In a conventional implementation, the MS 125 is to retain (e.g., store for subsequent use) only that non-distribution information contained in messages on the PACCH 140 that contain a TFI assigned to the MS 125 and, thus, is addressed to the MS 125. The MS 125 in such a conventional implementation is to discard non-distribution information contained in PACCH message blocks containing TFIs assigned to other MSs and, thus, that are addressed to these other MSs.

However, in the implementation of FIG. 6, the channel monitor 1005 is configured to not immediately discard the contents of PACCH or other channel message blocks not addressed to the MS 125 (e.g., not containing a TFI assigned to the MS 125). Instead, the channel monitor 1005 examines the messages sent via the channel (e.g., PACCH 140) for message blocks containing neighbor cell information regardless of whether the message blocks are addressed to the MS 125 or another MS. For example, in a scenario in which cell 1 of the GERAN system 100 supports NACC or NC2, or both, the cell will send PNCD messages containing neighbor cell system information to MSs (e.g., such as the MSs 130, 135) undergoing mobility procedures, such as cell reselection, PS handover, etc. Using the channel monitor 1005, the MS 125 examines the PACCH 140 for PNCD messages addressed to any MS (e.g., having any TFI) and is able to receive and retain (e.g., store for subsequent use) the neighbor cell system information contained in these PNCD messages sent to other MSs (e.g., such as the MSs 130, 135).

The MS 125 of FIG. 6 also includes a message decoder 1010 to decode the messages received by the channel monitor. In an example implementation, the message decoder 1010 implements a PNCD message decoder and is configured to decode PNCD messages to obtain the neighbor cell system information contained in these messages. For example, PNCD messages are used to convey neighbor cell system information in the form of one or more SI messages, such as the SI messages SI-1, SI-3, and SI-13 messages discussed above. The message decoder 1010 decodes the SI messages included in the PNCD messages received by the channel monitor 1005. The message decoder 1010 also associates the decoded SI messages with a particular neighbor cell using identification information contained in the decoded PNCD message or in other messages related to the provisioning of neighbor cell information (e.g., such as PCCC, PCCO and PSHO messages) that are received by the channel monitor 1005. The resulting decoded neighbor cell system information (e.g., decoded SI messages) and the associations of the decoded information with particular neighbor cells are stored in a memory unit 1015.

In some operating scenarios, the message decoder 1010 is able to decode a complete SI message from a single PNCD message. However, in other operating scenarios, the message decoder 1010 decodes SI messages by combining system information contained in multiple PNCD messages sent in a given radio block period or across multiple radio block periods. Example operation of the message decoder 1010 to decode SI messages from received PNCD messages and to associate the decoded SI messages with a particular neighbor cell is illustrated in FIGS. 7-8.

Figure 7:
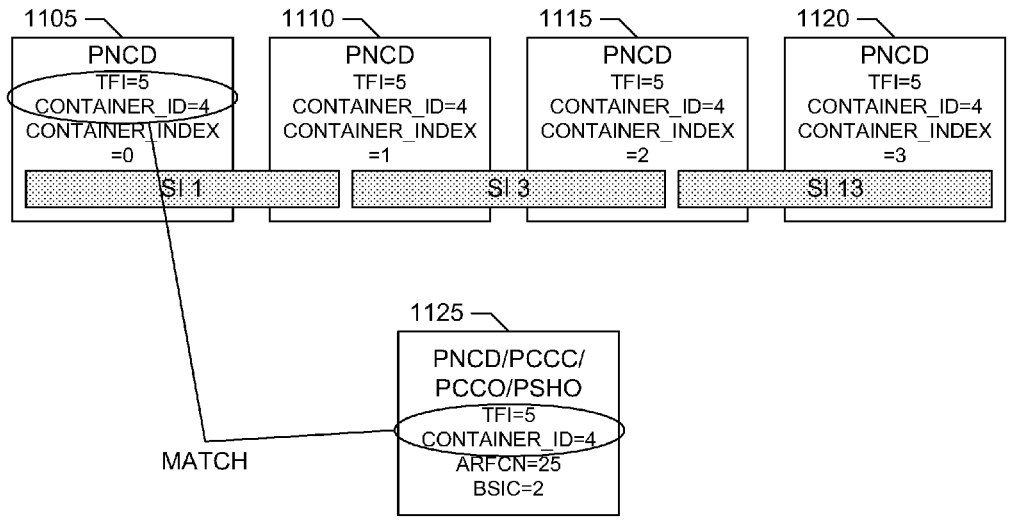
FIG. 7 illustrates a first example neighbor cell data combining operation performed by the mobile station of FIG. 6.
Figure 8:
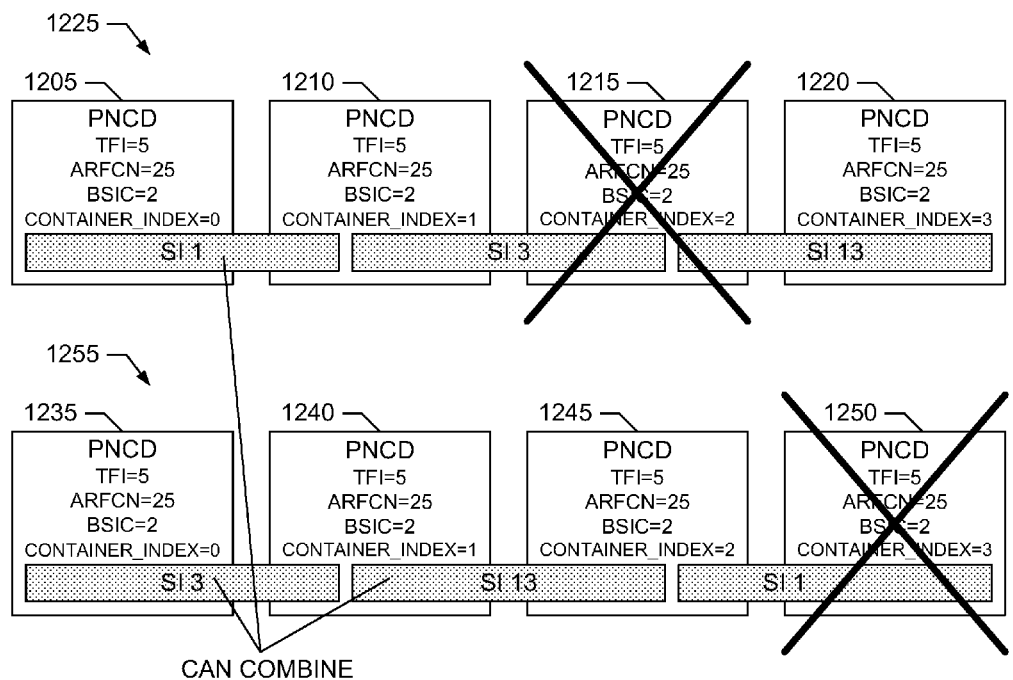
FIG. 8 illustrates a second example neighbor cell data combining operation performed by the mobile station of FIG. 6.

For example, FIG. 7 depicts four PNCD messages 1105, 1110, 1115 and 1120 sent by cell 1 to an MS other than the MS 125 during a given radio block period. The PNCD messages 1105-1120 are used to convey SI messages SI-1, SI-3 and SI-13 for a particular neighbor cell. Because each SI message is larger than the payload supported by any one of the PNCD messages 1105-1120, each SI message is split over two adjacent PNCD messages 1105-1120 as shown. In the illustrated example, the message decoder 1010 uses temporary identifiers included in the received PNCD messages 1105-1120 to combine information contained in the multiple PNCD messages 1105-1120 to decode the SI messages SI-1, SI-3 and SI-13 and associate the decoded SI messages with a particular neighbor cell.

For example, the message decoder 1010 determines that each of the PNCD messages 1105-1120 is addressed to the same MS, for example, because the TFI in each of these PNCD messages is the same (e.g., TFI=5 in the illustrated example) and the messages were received on the same timeslot index (e.g., for BTTI mode) or pair of timeslot indices (e.g., for RTTI mode). Alternatively, since the probability of two mobiles being assigned a TBF using the same TFI (but using non-overlapping timeslots) and receiving PNCD messages at the same time is very low, the MS may combine PNCD messages with the same TFI but received on different timeslots or timeslot pairs. Thus, the TFI is a first temporary identifier included in the received PNCD messages 1105-1120 that, possibly in conjunction with the received timeslot index or pair of timeslot indices, can be used to determine which received PNCD messages can be grouped together as being addressed to the same MS. The message decoder 1010 further determines that the SI messages included in the PNCD messages 1105-1120 contain neighbor cell system information for the same neighbor cell because the CONTAINER_ID included in each of these PNCD messages is the same (e.g., CONTAINER_ID=4 in the illustrated example). The CONTAINER_ID is a second temporary identifier included in the received PNCD messages 1105-1120 to group neighbor cell information for a particular neighbor cell. In at least some implementations, the CONTAINER_ID is used instead of explicitly identifying the neighbor cell because the CONTAINER_ID is smaller than the complete identification information for a cell. By combining neighbor cell system information received over the multiple PNCD messages according to TFI (as well as timeslot index or pair of timeslot indices in some examples) and CONTAINER_ID, and in the order specified by the CONTAINER_INDEX parameter, the message decoder 1010 can group and decode SI messages for a particular neighbor cell. In order to reduce the risk of combining PNCD messages that were not addressed to the same mobile, or do not relate to the same cell, but nevertheless have the same TFI (or same TFI and same CONTAINER_ID) values (e.g., because the TFI was reassigned and/or the PNCD messages were received in different timeslots/PDCHs), the message decoder 1010 may apply a time restriction on the length of a time window within which such messages may be received and combined.

Additionally, in some example implementations, the message decoder 1010 is configured to monitor for PACCH messages sent using a different transmission time interval (TTI) from that used for downlink messages addressed to the MS 125. For example, in the downlink, the network may send message blocks to a first MS using a first TTI (e.g. such as a BTTI wherein one block is transmitted over 20 ms) and message blocks to a second MS using a different TTI (e.g. such as an RTTI wherein one block is transmitted using two timeslots over 10 ms). Conventionally, an MS monitors and decodes message blocks assuming the TTI which is applicable to its TBF(s). However, in at least some example implementations, the MS 125 implementing the message decoder 1010 could attempt to decode message blocks using a different TTI than the TTI applicable to its TBF(s).

When the message decoder 1010 uses temporary identifiers to associate decoded SI messages with a particular neighbor cell, the message decoder 1010 uses information from other messages received by the channel monitor 1005 to identify the particular neighbor cell corresponding to the decoded neighbor cell information. For example, FIG. 7 depicts another message 1125 received by the channel monitor 1005, such as another PNCD message or a PCCC, PCCO or PSHO message. The message decoder 1010 decodes the message 1125 and determines that the TFI and CONTAINER_ID included in the decoded message 1125 match the TFIs and CONTAINER_IDs included in the decoded PNCD messages 1105-1120. The message decoder 1010 further determines that the message 1125 includes cell identification information in the form of a base station identification code (BSIC=2 in the illustrated example) and an absolute radio frequency channel number (ARFCN=25 in the illustrated example). Thus, by correlating the TFIs and CONTAINER_IDs included in the decoded PNCD messages 1105-1120 and the decoded message 1125, the message decoder is able to determine that the SI messages decoded from the PNCD messages 1105-1120 are associated with the neighbor cell identified by the BSIC and ARFCN included in the message 1125. In example scenario in which complete cell identification information (e.g., such as BSICs and ARFCNs) are included in the PNCD messages containing neighbor cell system information, the message decoder 1010 can associate decoded SI messages with a particular neighbor cell directly without using the temporary identifiers described above.

FIG. 8 depicts a scenario in which neighbor cell system information contained in PNCD messages sent over multiple radio block periods is combined to decode SI messages for a particular neighbor cell. In the illustrated example, PNCD messages 1205, 1210, 1215 and 1220 are sent first during one or more radio block periods 1225. In the illustrated example, the message decoder 1010 decodes the PNCD messages 1205, 1210 and 1220 addressed to another MS assigned TFI=5, but does not decode the PNCD message 1215 (e.g., due to a scheduling conflict). Because the message decoder 1010 is unable to decode the PNCD message 1215, the message decoder 1010 is also unable to decode the SI-3 and SI-13 messages sent in the radio block period 1225. Thus, during the radio block period 1225, the message decoder 1010 decodes only the SI-1 message conveyed via the PNCD messages 1205 and 1210 that were successfully decoded.

However, in the illustrated example, PNCD messages 1235, 1240, 1245 and 1250 conveying these same SI messages for the same neighbor cell (e.g., represented by BSIC=2 and ARFCN=25) are sent again during subsequent radio block period(s) 1255. Again, the message decoder 1010 is unable to decode one of the received PNCD messages, the PNCD message 1250 (e.g., due to a scheduling conflict), but is able to decode the other PNCD messages 1235-1245. Because the network also varies the ordering of the SI messages across radio block periods as shown in the example of FIG. 8, the message decoder 101 is able to decode the SI-3 and SI-13 messages from the PNCD messages 1235-1245 received during the radio block period 1255 and combine these messages with the SI-1 message decoded from the PNCD messages 1205-1210 received during the radio block period 1225 to obtain complete information for this neighbor cell (e.g., represented by BSIC=2 and ARFCN=25).

Returning to FIG. 6, in at least some example implementations, the channel monitor 1005 and the message decoder 1010 are configured to receive and decode distribution (e.g., broadcast) messages containing neighbor cell system information broadcast via the channel to some or all MSs. For example, cell 1 in the GERAN system 100 could be configured to broadcast packet neighbor cell system information distribution messages each containing all or part of an SI message for a particular neighbor cell and that can be received and decoded by any MS configured to receive messages via the PACCH 140. Such distribution messages containing neighbor cell system information could be broadcast instead of non-distribution PNCD whenever a particular MS is involved in certain mobility procedures, such as NACC or NC2 procedures. Thus, in such an example implementation, whenever any MS is involved in these certain mobility procedures, all MSs configured to receive messages via the PACCH 140 can benefit from the neighbor cell system information being sent by the network.

As shown and described in FIGS. 6-8, as well as the preceding figures, the channel monitor 1005 and the message decoder 1010 can be used to implement monitoring of channels for neighbor cell information in the MS 125 while the MS 125 is operating in PS mode, DTM mode, or also idle mode. The neighbor cell system information obtained by the channel monitor 1005 and the message decoder 1010 can be used by a neighbor cell access processor 1020 included in the MS 125 in idle mode or PS mode to, for example, perform cell reselection using stored neighbor cell information rather than, or in addition to, neighbor cell information provided by the network, thereby potentially resulting in faster cell reselection. In dedicated mode or DTM mode, the neighbor cell access processor 1020 can use stored neighbor cell information to expedite CRE because the MS 125 may not have to wait to receive SI messages broadcast by the target cell before initiating call reestablishment signaling.

Referring again to FIG. 6, the MS 125 of the illustrated example also includes a system information validity processor 1025 to set one or more SI validity indications representing whether the MS 125 has valid system information (e.g., SI messages) stored for one or more neighbor cells. In the illustrated example, the system information validity processor 1025 sets the SI validity indication(s) when undergoing certain mobility procedures, such as cell reselection with NACC enabled, measurement reporting in NC2 mode, etc. In an example implementation, an SI validity indication is implemented by a bitmap or set of bits associated with a particular neighbor cell, with each bit associated with a particular SI message for that neighbor cell. For example, an SI validity indication for cell 2 could be implemented as a bitmap having three (3) bits, with a first bit associated with the SI-1 message for cell 2, a second bit associated with the SI-3 message for cell 2, and a third bit associated with the SI-13 message for cell 2. Alternatively, the SI validity indication could be implemented as a bitmap in which each bit represents a particular neighbor cell and indicates whether all necessary (or a particular set or subset) SI messages for the neighbor cell are stored in the MS 125 (e.g., similar to an all-or-nothing indication). For example, the SI validity indication could be implemented as a bitmap having six (6) bits representative of 6 neighbor cells, with a first bit indicating whether the SI-1, SI-3 and SI-13 messages are all stored for cell 1, a second bit indicating whether the SI-1, SI-3 and SI-13 messages are all stored for cell 2, a third bit indicating whether the SI-1, SI-3 and SI-13 messages are all stored for cell 3, and so on. Alternatively, the SI validity indication could indicate the time since the associated SI was most recently received. For example, the SI validity indication could indicate whether an SI message was most recently received within the last 30 seconds (s), within the last hour, within the last 12 hours, or has not been received within the last 12 hours. In this latter example, the network can determine whether to send SI message(s) to the MS 125 based on either or both of (i) when the SI message(s) were received by the MS 125 as indicated by the reported SI validity indication(s), and (ii) whether the contents of the SI message(s) changed since being received by the MS 125.

In the illustrated example, the system information validity processor 1025 sets a bit in the SI validity indication bitmap to indicate that the corresponding SI message for the corresponding neighbor cell is stored (and valid) at the MS 125. The system information validity processor 1025 clears bit(s) for corresponding SI message(s) that are not stored (and, thus, not valid) at the MS 125. In an example implementation, an SI message for neighbor cells can be stored in the memory unit 1015 of the MS 125 for a certain period of time (e.g., 30 sec.) after which the SI message is to be discarded. The neighbor cell system information reported via the SI validity indication(s) set by the system information validity processor 1025 may be obtained in any appropriate manner, such as via monitoring channels for neighbor cell information, receiving SI messages broadcast via one or more neighbor cells, etc.

The MS 125 of FIG. 6 also includes a message encoder 1030 to encode the SI validity indication(s) set by the system information validity processor 1025 into one or more messages to be sent to the network (e.g., sent to cell 1 in the GERAN system 100). For example, with reference to FIG. 3, when the MS 125 is undergoing cell reselection with CCN enabled, the message encoder 1030 includes the SI validity indication(s) set by the system information validity processor 1025 in the PCCN message 718 sent to cell 1 (e.g., such as in a bit field or measurement report included in the PCCN message 718). In this way, the SI validity indication(s) included by the message encoder 1030 in the PCCN message 718 indicate what, if any, neighbor cell system information is stored (and valid) at the MS 125 and, thus, is already available for the cell reselection procedure. Additionally or alternatively, when the MS 125 is operating in NC 2 mode, the message encoder 1030 includes the SI validity indication(s) set by the system information validity processor 1025 in one or more measurement reports sent by the MS 125 for cell reselection. Again, these SI validity indication(s) indicate what, if any, neighbor cell system information is stored (and valid) at the MS 125 and, thus, does not need to be provided by the network prior to reselecting to the target neighbor cell.

Thus, as shown and described in FIG. 6, as well as the preceding figures, the system information validity processor 1025 and the message encoder 1030 can be used to implement avoidance of transmission of redundant neighbor cell information in the MS 125 while the MS 125 is operating in PS mode, DTM mode, or also idle mode.

While an example manner of implementing the example MS 125 of FIG. 1 has been illustrated in FIG. 6, one or more of the elements, processes and/or devices illustrated in FIG. 6 may be combined, divided, re-arranged, omitted, eliminated and/or implemented in any other way. Further, the example channel monitor 1005, the example message decoder 1010, the example memory unit 1015, the example neighbor cell access processor 1020, the example system information validity processor 1025, the example message encoder 1030 and/or, more generally, the example MS 125 of FIG. 6 may be implemented by hardware, software, firmware and/or any combination of hardware, software and/or firmware. Thus, for example, any of the example channel monitor 1005, the example message decoder 1010, the example memory unit 1015, the example neighbor cell access processor 1020, the example system information validity processor 1025, the example message encoder 1030 and/or, more generally, the example MS 125 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example MS 125, the example channel monitor 1005, the example message decoder 1010, the example memory unit 1015, the example neighbor cell access processor 1020, the example system information validity processor 1025 and/or the example message encoder 1030 are hereby expressly defined to include a tangible medium such as a memory, digital versatile disk (DVD), compact disk (CD), etc., storing such software and/or firmware. Further still, the example MS 125 of FIG. 6 may include one or more elements, processes and/or devices in addition to, or instead of, those illustrated in FIG. 6, and/or may include more than one of any or all of the illustrated elements, processes and devices.

A block diagram of an example implementation of the BSC 105 of FIG. 1 (possibly in conjunction with a BTS, such as the BTS 110) is illustrated in FIG. 9. Although described from the perspective of implementing cell 1 of FIG. 1, the example implementation illustrated in FIG. 9 could also be used to implement either or both of cells 2 and 3 of FIG. 1. Turning to FIG. 9, the illustrated example implementation of the BSC 105 includes a system information validity decoder 1305 to decode SI validity indications included in messages received from MSs, such as the MS 125. The BSC 105 may be implicitly configured to support receiving SI validity indications, or may be configured to broadcast a message indicating whether receipt of SI validity indications is supported. For example, if NACC is supported, the system information validity decoder 1305 decodes SI validity indications included in PCCN messages sent by the MS 125 during cell reselection. Additionally or alternatively, if NC2 mode is supported, the system information validity decoder 1305 decodes SI validity indications included in measurement reports provided by the MS 125.

In conventional implementations, the BSC 105 and, more generally, the network are unaware of what, if any, neighbor cell system information is stored at the MS 125. Unlike conventional implementations, the system information validity decoder 1305 decodes SI validity indications provided by the MS 125 to determine what, if any, valid neighbor cell system information is already stored at the MS 125. The BSC 105 can use these indications to determine whether and what neighbor cell system information to schedule for subsequent sending to the MS 125. As described above, in the illustrated example of FIG. 7, the SI validity indication is implemented by a bitmap or set of bits associated with a particular neighbor cell, with each bit associated with a particular SI message for that neighbor cell, or with each bit in the bitmap associated with a respective neighbor cell and indicating whether all needed SI messages (e.g., such as a particular set or subset of SI messages) are stored for that neighbor cell, or with one or more bits associated with a respective neighbor cell and indicating the time since the most recent reception of one or more respective SI messages for that neighbor cell. In such an example, the system information validity decoder 1305 decodes each bit in a received SI validity indication bitmap to determine what, if any, valid SI messages are stored at the MS 125 for the neighbor cell(s) corresponding to the decoded SI validity indication bitmap.

The BSC 105 of FIG. 9 also includes a message scheduler 1310 to schedule subsequent sending of messages containing neighbor cell information based on the SI validity indications decoded by the system information validity decoder 1305. For example, with reference to FIG. 3, in response to receiving an SI validity indication in the PCCN message 718 sent by the MS 125 during cell reselection with NACC enabled, the message scheduler 1310 determines what, if any, SI messages for the target cell (cell 2) are to be sent to the MS 125 via subsequent PNCD messages. For example, in FIG. 3, the PCCN message 718 sent by the MS 125 could include an SI validity indication bitmap for cell 2 with the bits corresponding to the SI-1 and SI-3 being set. Accordingly, the message scheduler 1310 determines that valid SI-1 and SI-3 messages for cell 2 are already stored at the MS 125 and, thus, the message scheduler 1310 determines to omit scheduling of PNCD messages to convey these same SI messages again to the MS 125. Instead, the message scheduler 1310 schedules only the PNCD message 652 containing the SI-13 message for cell 2 for subsequent sending to the MS 125.

Thus, as shown and described in FIG. 9, as well as the preceding figures, the system information validity decoder 1305 and the message scheduler 1310 can be used to implement avoidance of transmission of redundant neighbor cell information in the BSC 105 (and, more generally, in the GERAN network 100).

While an example manner of implementing the example BSC 105 of FIG. 1 has been illustrated in FIG. 9, one or more of the elements, processes and/or devices illustrated in FIG. 9 may be combined, divided, re-arranged, omitted, eliminated and/or implemented in any other way. Further, the example system information validity decoder 1305, the example message scheduler 1310 and/or, more generally, the example BSC 105 of FIG. 9 may be implemented by hardware, software, firmware and/or any combination of hardware, software and/or firmware. Thus, for example, any of the example system information validity decoder 1305, the example message scheduler 1310 and/or, more generally, the example BSC 105 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example BSC 105, the example system information validity decoder 1305 and/or the example message scheduler 1310 are hereby expressly defined to include a tangible medium such as a memory, digital versatile disk (DVD), compact disk (CD), etc., storing such software and/or firmware. Further still, the example the example BSC 105 of FIG. 9 may include one or more elements, processes and/or devices in addition to, or instead of, those illustrated in FIG. 9, and/or may include more than one of any or all of the illustrated elements, processes and devices.

Figure 10:
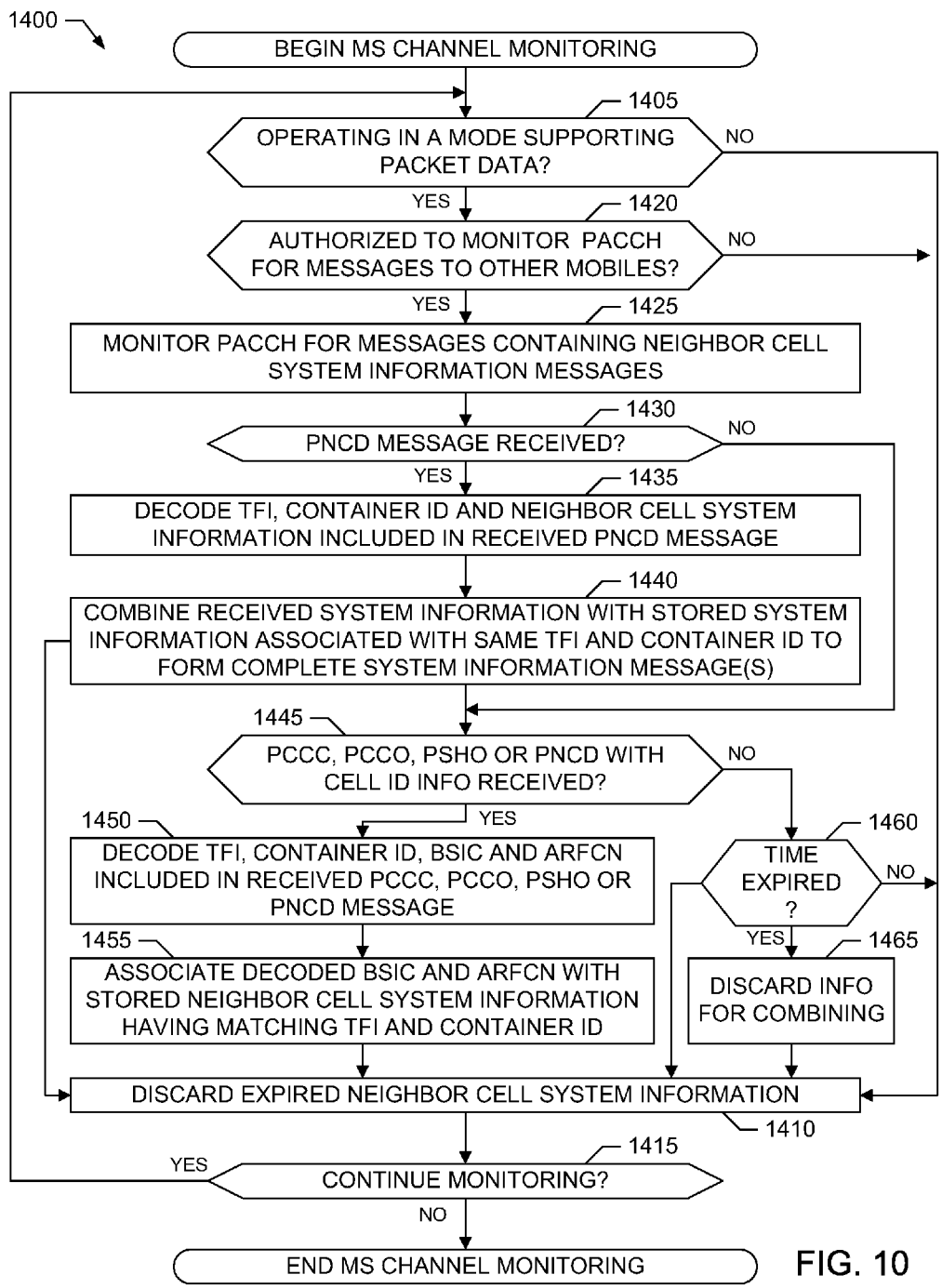
FIG. 10 is a flowchart representative of an example channel monitoring process that may be performed to implement the mobile station of FIG. 6 or the communication system of FIG. 1, or both.
Figure 11A:
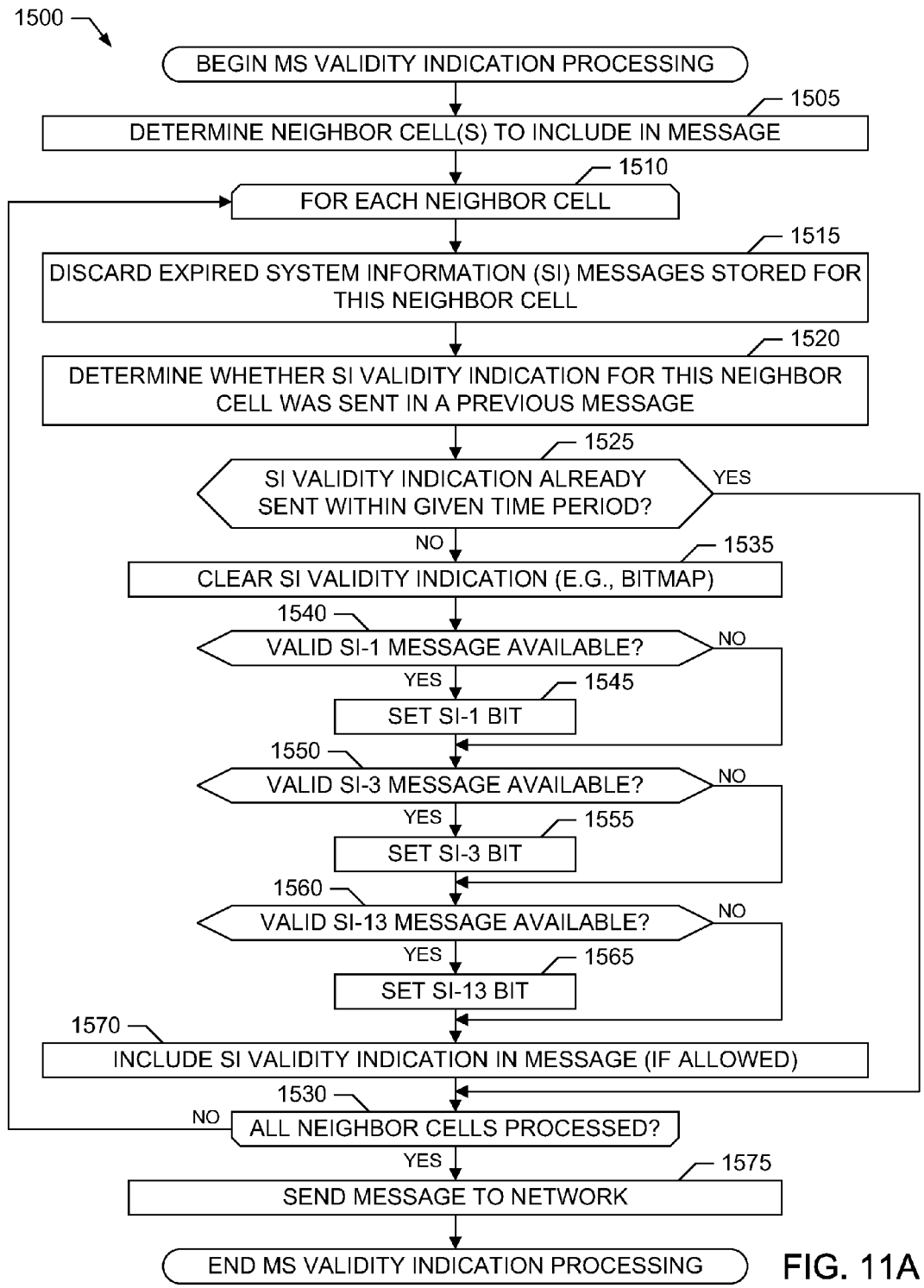
FIG. 11A is a flowchart representative of an example neighbor cell validity indication process that may be performed to implement the mobile station of FIG. 6 or the communication system of FIG. 1, or both.
Figure 11B:
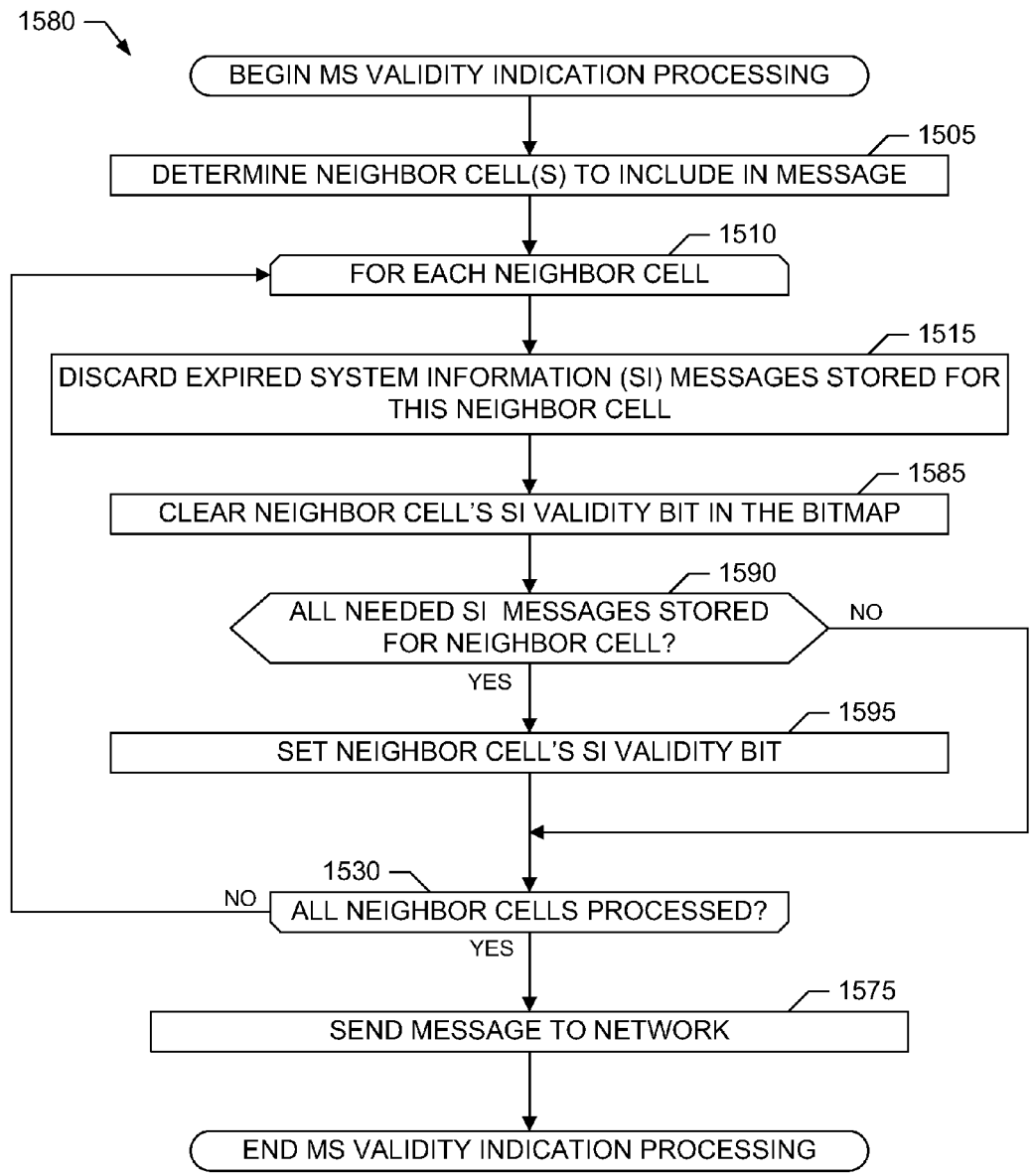
FIG. 11B is a flowchart representative of another example neighbor cell validity indication process that may be performed to implement the mobile station of FIG. 6 or the communication system of FIG. 1, or both.
Figure 12:
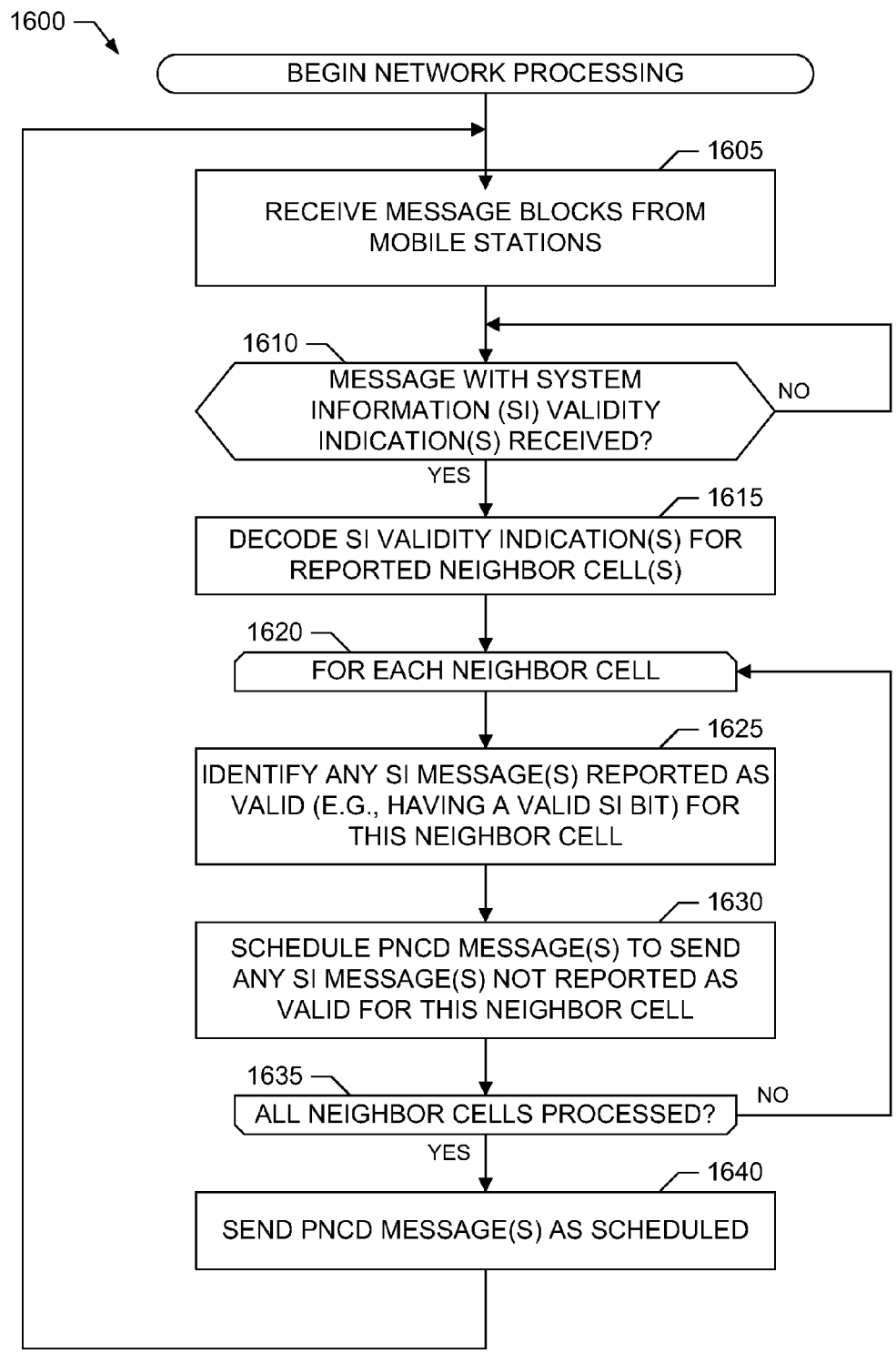
FIG. 12 is a flowchart representative of an example network process that may be performed to implement the network element of FIG. 9 or the communication system of FIG. 1, or both.

Flowcharts representative of example processes that may be executed to implement any, some or all of the example GERAN communication system 100, the example BSC 105 (possibly in conjunction with one or more of the example BTSs 110-120), the example MSs 125-135, the cell 205, the cell 605, the example channel monitor 1005, the example message decoder 1010, the example memory unit 1015, the example neighbor cell access processor 1020, the example system information validity processor 1025, the example message encoder 1030, the example system information validity decoder 1305 and the example message scheduler 1310 are shown in FIGS. 10-12.

In these examples, the process represented by each flowchart may be implemented by one or more programs comprising machine readable instructions for execution by: (a) a processor, such as the processor 1712 shown in the example processing system 1700 discussed below in connection with FIG. 13, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 1712, but the entire program or programs and/or portions thereof could alternatively be executed by a device other than the processor 1712 and/or embodied in firmware or dedicated hardware (e.g., implemented by an application specific integrated circuit (ASIC), a programmable logic device (PLD), a field programmable logic device (FPLD), discrete logic, etc.). For example, any one, some or all of the example GERAN communication system 100, the example BSC 105 (possibly in conjunction with one or more of the example BTSs 110-120), the example MSs 125-135, the cell 205, the cell 605, the example channel monitor 1005, the example message decoder 1010, the example memory unit 1015, the example neighbor cell access processor 1020, the example system information validity processor 1025, the example message encoder 1030, the example system information validity decoder 1305 and the example message scheduler 1310 could be implemented by any combination of software, hardware, and/or firmware. Also, some or all of the processes represented by the flowcharts of FIGS. 10-12 may be implemented manually.

Further, although the example processes are described with reference to the flowcharts illustrated in FIGS. 10-12, many other techniques for implementing the example methods and apparatus described herein may alternatively be used. For example, with reference to the flowcharts illustrated in FIGS. 10-12, the order of execution of the blocks may be changed, and/or some of the blocks described may be changed, eliminated, combined and/or subdivided into multiple blocks.

An example process 1400 that may be performed to implement monitoring of channels for neighbor cell information in any, some or all of the example MSs 125, 130 and 135 of FIG. 1 or 6, or both, is illustrated in FIG. 10. The process 1400 may be executed at predetermined intervals (e.g., such as based on a multiple of a radio block period), based on an occurrence of a predetermined event (e.g., such as performance of certain mobility procedures), as a background process, etc., or any combination thereof. Although the process 1400 could be used to implement any of the MSs 125, 130 and 135, for brevity and clarity, operation of the process 1400 is described from the perspective of implementation in the MS 125 of FIG. 6 for operation in the GERAN system 100 of FIG. 1.

With reference to the preceding figures, the process 1400 of FIG. 10 begins at block 1405 at which the process 1400 determines whether the MS 125 is operating in a mode supporting packet-switched data, such as a packet mode supporting packet data traffic, a dual transfer mode (DTM) supporting both packet data traffic and circuit data traffic, or even an idle mode. If the MS 125 is not operating in a mode supporting packet-switched data (block 1405), the MS 125 then discards any expired neighbor cell system information at block 1410. For example, the MS 125 may be configured to delete any neighbor cell system information that has been stored in the memory unit 1415 for more than a specified time period (e.g., such as 30 sec.). Next, the process 1400 determines at block 1415 whether monitoring of channels for neighbor cell information is to continue (e.g., based on any appropriate criteria or input). If such monitoring is to continue (block 1415), the process 1400 returns to block 1405 and blocks subsequent thereto to continue processing. However, if monitoring of channels for neighbor cell information is not to continue (block 1415), the process 1400 ends.

Returning to block 1405, if the MS 125 is operating in a mode supporting packet-switched data (block 1405), the process 1400 then determines at block 1420 whether the MS 125 is authorized to monitor the PACCH channel 140 for neighbor cell information. For example, such authorization may be implicit such that PACCH monitoring is always permitted, or the network may send one or more messages to authorize the MS 125 to monitor the PACCH 140. If PACCH monitoring is not authorized (block 1420), operation of the process 1400 proceeds to block 1410 and subsequent blocks, as described above.

However, if PACCH monitoring is authorized (block 1420), then at block 1425 the channel monitor 1005 included in the MS 125 monitors the PACCH 140 for non-distribution PNCD messages addressed to any MS configured to receive message blocks via the PACCH channel 140 and that contain neighbor cell system information. (In an example implementation, the channel monitor 1005 may also monitor the PACCH 140 for distribution messages containing neighbor cell system information broadcast to all MSs receiving message blocks via PACCH 140). If the channel monitor 1005 determines that a received message is a PNCD message (block 1430), then at block 1435 the message decoder 1010 included in the MS 125 decodes the PNCD message received by the channel monitor 1005 regardless of which MS was the intended recipient of the PNCD message. For example, with reference to FIG. 7, at block 1435 the message decoder 1010 decodes the SI message, or portion thereof, included in the received PNCD message. Additionally, message decoder 1010 decodes the TFI and CONTAINER_ID (and/or other) temporary identifies included in the received PNCD message and that can be used to associate the decoded SI message, or portion thereof, with a particular neighbor cell.

Next, at block 1440 the message decoder 1010 uses the decoded TFI and CONTAINER_ID temporary identifiers as illustrated in FIGS. 7-8 to combine the SI message, or portion thereof, with stored SI message(s), or portion(s) thereof, having the same TFI and CONTAINER_ID temporary identifiers to form complete SI message(s) for the particular neighbor cell associated with the TFI and CONTAINER_ID. For example, the stored SI message(s), or portion(s) thereof, used for combining at block 1440 may have been obtained by decoding PNCD messages received via the PACCH 140 in the same radio block period, one or more previous radio block periods, or any combination thereof. Next, operation of the process 1400 proceeds to block 1410 and subsequent blocks, as described above.

Next, operation of the process 1400 proceeds to block 1445. The process 1400 also reaches block 1445 if, at block 1430, the channel monitor 1005 determines that a received message is not a PNCD message. At block 1445, the channel monitor 1005 determines whether the received message is a type of message related to the provisioning of neighbor cell information and that includes neighbor cell identification information, such as a PCCC, PCCO, PSHO or PNCD message containing cell identification information. If the channel monitor 1005 determines that the received message is a PCCC, PCCO, PSHO or PNCD message containing cell identification information (block 1445), then at block 1450 the message decoder 1010 included in the MS 125 decodes the PCCC/PCCO/PSHO/PNCD message received by the channel monitor 1005 regardless of which MS was the intended recipient of the PCCC/PCCO/PSHO/PNCD message. For example, with reference to FIGS. 7-8, at block 1450 the message decoder 1010 decodes the TFI and CONTAINER_ID (and/or other) temporary identifies included in the received PCCC/PCCO/PSHO/PNCD message. Additionally, at block 1450 the message decoder 1010 decodes the BSIC and ARFCN included in the received PCCC/PCCO/PSHO/PNCD message. Then, at block 1455 the message decoder 1010 uses the information decoded at block 1450 to identify stored neighbor cell SI messages associated with a particular the TFI and CONTAINER_ID as corresponding to a particular neighbor cell identified by the BSIC and ARFCN. As described above, the MS 125 can then use the stored neighbor cell SI messages associated with particular neighbor cells in various mobility procedures, such as cell reselection, CRE, etc. Next, operation of the process 1400 proceeds to block 1410 and subsequent blocks, as described above.

Returning to block 1445, if the channel monitor 1005 determines that no PCCC, PCCO, PSHO or PNCD message containing cell identification information has been received, then at block 1460 the message decoder 1010 determines whether a time period has expired. The time period examined at block 1460 is used to specify a window of time during which stored neighbor cell information can be combined with newly received neighbor cell information. For example, the temporary identifiers (e.g., such as TFIs, CONTAINER IDs, etc.) used to associate neighbor cell information with a particular neighbor cell can be reassigned over time. As such, after some period of time, newly received neighbor cell information associated with a specific set of temporary identifiers may correspond to a different neighbor cell than stored neighbor cell information associated with those same temporary identifiers. Accordingly, if the time period has expired (block 1460), then at block 1465 the message decoder 1010 discards any neighbor cell information that was being stored for combining with neighbor cell information the message decoder 1010 was waiting to receive. Next, operation of the process 1400 proceeds to block 1410 and subsequent blocks, as described above.

An example process 1500 that may be performed to implement SI validity indication processing in any, some or all of the example MSs 125, 130 and 135 of FIG. 1 or 6, or both, is illustrated in FIG. 11A. The process 1500 may be executed at predetermined intervals (e.g., such as based on a multiple of a radio block period), based on an occurrence of a predetermined event (e.g., such as performance of certain mobility procedures, when certain measurement reports are to be prepared, etc.), as a background process, etc., or any combination thereof. Although the process 1500 could be used to implement any of the MSs 125, 130 and 135, for brevity and clarity, operation of the process 1500 is described from the perspective of implementation in the MS 125 of FIG. 6 for operation in the GERAN system 100 of FIG. 1.

With reference to the preceding figures, the process 1500 of FIG. 11B begins at block 1505 at which the process 1500 determines which neighbor cell or cells are to be reported in a message to be sent to the network (e.g., such as via cell 1 of FIG. 1). For example, at block 1505 the message may correspond to the PCCN message 718 of FIG. 3 and, thus, the neighbor cell to be reported is the target neighbor cell for cell reselection. As another example, at block 1505 the message may correspond to a measurement report in which measurements for one or more neighbor cells are to be reported to the network.

Next, at block 1510 the process 1500 begins validity indication processing for each neighbor cell to be included in the message being sent to the network. For example, at block 1515 the process 1500 discards any expired neighbor cell system information stored for the current neighbor cell being processed. For example, the MS 125 may be configured to delete any neighbor cell system information that has been stored in the memory unit 1415 for more than a specified time period (e.g., such as 30 sec.). Then, at block 1520 the process 1500 determines whether an SI validity indication for the current neighbor cell being processed was already sent in a previous message within a given time period (e.g., such as 10 sec.). If the SI validity indication for the current neighbor cell was previously sent within the time period (block 1525), then at block 1530 the process 1500 determines whether there are additional neighbor cells to process.

However, if the SI validity indication for the current neighbor cell was not previously sent within the time period (block 1525), then at block 1535 the system information validity processor 1025 included in the MS 125 clears the SI validity indication bitmap for the current neighbor cell being processed. Then, at block 1540 the system information validity processor 1025 determines whether a valid SI-1 message is stored for the current neighbor cell being processed. If a valid SI-1 message is stored for the neighbor cell (block 1540), at block 1545 the system information validity processor 1025 sets the SI-1 bit in the SI validity indication bitmap that is used to indicate that a valid SI-1 message for the neighbor cell is stored at the MS 125.

Next, at block 1550 the system information validity processor 1025 determines whether a valid SI-3 message is stored for the current neighbor cell being processed. If a valid SI-3 message is stored for the neighbor cell (block 1550), at block 1555 the system information validity processor 1025 sets the SI-3 bit in the SI validity indication bitmap that is used to indicate that a valid SI-3 message for the neighbor cell is stored at the MS 125. Then, at block 1560 the system information validity processor 1025 determines whether a valid SI-13 message is stored for the current neighbor cell being processed. If a valid SI-13 message is stored for the neighbor cell (block 1560), at block 1565 the system information validity processor 1025 sets the SI-13 bit in the SI validity indication bitmap that is used to indicate that a valid SI-13 message for the neighbor cell is stored at the MS 125.

Next, the message encoder 1030 included in the MS 125 encodes the SI validity indication bitmap for the neighbor cell currently being processed in the message (e.g., such as a PCCN message, a measurement report, etc.) to be sent to the network (if transmission of SI validity indications to the network is implicitly or explicitly authorized). Then, at block 1530 the process 1500 determines whether there are additional neighbor cells to process. If there are additional neighbor cells to process (block 1530), the process returns to block 1510 to obtain the next neighbor cell for validity indication processing. However, if there are no additional neighbor cells to process (block 1530), the MS 125 sends the message including the encoded SI validity indication(s) to the network. The process 1500 then ends.

An alternative example process 1580 that may be performed to implement SI validity indication processing in any, some or all of the example MSs 125, 130 and 135 of FIG. 1 or 6, or both, is illustrated in FIG. 11B. For comparison, the process 1500 of FIG. 11A processes a separate validity indication for each neighbor cell being reported, with each bit in the validity indication representing a status of a separate SI message for the particular neighbor cell. In contrast, the process 1580 of FIG. 11B processes a single validity indication bitmap in which each bit represents a particular neighbor cell and indicates whether all necessary SI messages (or a particular set or subset of SI messages) for the neighbor cell are stored in the MS. Because the example processes 1500 and 1580 of FIGS. 11A and 11B, respectively, include many elements in common, like elements in FIGS. 11A and 11B are labeled with the same reference numerals. Detailed descriptions of these like elements are provided above in connection with the process 1500 of FIG. 11A.

Turning to FIG. 11B, the process 1580 is described from the perspective of implementation in the MS 125 of FIG. 6 for operation in the GERAN system 100 of FIG. 1, and operation of the process 1580 from block 1505 through 1515 is substantially the same as for the process 1500 of FIG. 11A. However, after block 1515 in FIG. 11B, the process 1580 proceeds to block 1585 at which the system information validity processor 1025 included in the MS 125 clears the particular bit of the SI validity indication bitmap corresponding to the current neighbor cell being processed. For example, the SI validity indication bitmap may include a number of bits (e.g., such as 6 bits), with each bit corresponding to a respective neighbor cell in a set of neighbor cells to be reported (e.g., such as up to 6 neighbor cells).

Next, at block 1590 the system information validity processor 1025 determines whether the MS 125 has stored all of the neighbor cell's SI messages needed by the MS 125 to support mobility or other procedures. If all of the needed SI messages (e.g., such as a specified set or subset of SI messages) for the current neighbor cell being processed are stored in the MS 125 (block 1590), then at block 1595 the system information validity processor 1025 sets the particular bit of the SI validity indication bitmap corresponding to the current neighbor cell being processed. The process 1580 then proceeds to block 1530 as described above in connection with FIG. 11A.

An example process 1600 that may be performed to implement SI validity indication processing in the BSC 105 (possibly in conjunction with one or more of the BTSs 110-120) is illustrated in FIG. 12. The process 1600 may be executed at predetermined intervals (e.g., such as based on a multiple of a radio block period), based on an occurrence of a predetermined event (e.g., such as when UL messages are received), as a background process, etc., or any combination thereof. Operation of the process 1600 is described from the perspective of implementation in the BSC 105 of FIG. 9 for operation in the GERAN system 100 of FIG. 1.

With reference to the preceding figures, the process 1600 of FIG. 12 begins at block 1605 at which the BSC 105 receives UL messages blocks from one or more MSs, such as the MS 125. Next, at block 1610 the process 1600 determines whether a message containing one or more SI validity indications has been received. When a message containing SI validity indication(s) is received (block 1610), at block 1615 the system information validity decoder 1305 included in the BSC 105 decodes the one or more SI validity indications for the respective one or more neighbor cells reported in the message received at block 1605. Then, for each reported neighbor cell (block 1620), the system information validity decoder 1305 determines whether the decoded SI validity indication bitmap being processed contains any bits set to indicate that a corresponding valid SI message for the current neighbor cell is stored at the MS 125, or a bit to indicate that all needed SI messages (e.g., such as a specified set or subset of SI messages) for the current neighbor cell are stored at the MS 125.

Next, at block 1630 the message scheduler 1310 schedules subsequent sending of PNCD messages containing neighbor cell information to the MS 125 based on the SI validity indication(s) decoded by the system information validity decoder 1305 at block 1625. For example, if the decoded SI validity indication has one or more SI bits that were not set to thereby indicate that the respective one or more SI messages for the current cell are not stored at the MS 125, then at block 1630 the message scheduler 1310 schedules one or more PNCD messages to send these corresponding one or more SI message to the MS 125. In other words, at block 1630 the message scheduler 1310 can forego sending (or, in other words, omit sending) PNCD messages containing SI messages reported as valid in the SI validity indication bitmap decoded at block 1630.

Next, at block 1635 the process 1600 determines whether all reported neighbor cells have been processed. If all reported neighbor cells have not been processed (block 1635), control returns to block 1620 and blocks subsequent thereto. However, if all reported neighbor cells have been processed (block 1635), the BSC 105 causes any PNCD message(s) to be sent to the MS 125 as scheduled at block 1630. The process 1600 then continues as shown.

As another example, the techniques to monitor channels for neighbor cell information described herein can be used to determine system information for a serving cell in communication with an MS in addition to, or as an alternative to, determining system information for one or more neighbor cells. For example, in a circuit switched (CS) voice call, or a DTM call, an MS, such as the MS 125, can be configured to monitor a PACCH, such as the PACCH 140, for non-distribution packet serving cell data (PSCD) messages containing serving cell SI messages being conveyed to another MS. Such monitoring can be performed in addition to, or as an alternative to, monitoring for PNCD messages containing neighbor cell SI messages being conveyed to another MS. Monitoring for PSCD messages containing SI messages for the serving cell can be beneficial in many scenarios. For example, the MS 125 may not yet possess system information for its serving cell, such as in the case of arriving to the serving cell by means of a handover. Also, in the case of a radio link timeout or failure, the MS 125 may determine that call re-establishment should be initiated to its serving cell, rather than a different cell, such as in the case of the radio link timeout or failure being caused by high interference specific to the resources assigned to the MS 125. In these and other examples, the MS 125 can use the techniques described herein to obtain current system information for the serving cell by monitoring PSCD messages addressed to other mobile stations.

Also, a conventional MS operating in a voice-only call typically is not configured to receive data via a PACCH. However, in at least some example implementations, the MS 125 could be configured to receive and decode message blocks conveyed via the PACCH 140 even though the MS 125 is operating in a voice-only call and, thus, is not to receive any messages addressed to itself via the PACCH 140. Additionally or alternatively, when operating in a mode supporting packet data communications, the MS 125 could be configured to receive and decode message blocks conveyed via the PACCH 140 even though the MS 125 is allocated to a different PACCH and, thus, is not to receive any messages addressed to itself via the PACCH 140. These example implementations allow the MS 125 to utilize the techniques to monitor channels for neighbor cell information described herein even when not operating in a mode supporting packet data communications and/or when not allocated to the channel to be monitored.

To potentially reduce power consumption when implementing the techniques described herein, the MS 125 can be configured to trigger channel monitoring for cell information under only certain conditions. For example, the MS 125 can trigger channel monitoring based on one or more of the following criteria: (1) certain channel conditions being detected in its serving cell, (2) signal strength and/or signal quality measurements associated with a neighbor cell different from the serving cell, (3) detection of a received message block error (e.g., such as one or more SACCH block errors), (4) occurrence of a cell change, etc.

As yet another example, the techniques to monitor channels for neighbor cell information and the techniques to avoid transmission of redundant neighbor cell information described herein can be implemented in a GERAN communication system conforming to the third generation partnership project (3GPP) specifications by appropriately modifying 3GPP Technical Specification (TS) 44.060, V9.0.0 (May 2009), which is hereby incorporated by reference in its entirety. Example modifications to 3GPP TS 44.060 to support the example techniques to monitor channels for neighbor cell information and the example techniques to avoid transmission of redundant neighbor cell information described herein include, but are not limited to, the following changes:

(I) Modify section 5.5.1.1a.1, "Neighbour Cell System Information Distribution," to indicate that a mobile station receiving neighbor cell system information in a PACKET NEIGHBOUR CELL DATA message which is not addressed to it may store the information for up to 30 seconds and during that period may use the information for initial access to the corresponding neighbor cell.

(II) Modify section 8.3, "Procedure for measurement report sending in Packet Transfer mode," to indicate that if the network indicates that it supports reception of VALID_SI indications, the mobile station may include a VALID_SI indication in the PACKET MEASUREMENT REPORT message or PACKET ENHANCED MEASUREMENT REPORT message. Additionally, the mobile station shall include this information in such a message if it has not sent this information in the last 10 seconds.

(III) Modify section 8.8.1, "Neighbour Cell System Information Distribution," to indicate that if a mobile station to which a PACKET NEIGHBOUR CELL DATA message was not addressed decodes the contents of the message, the container identity is determined by the combination of TFI and CONTAINER_ID contained within the instances of the message. Such a mobile station may combine complete system information messages obtained from partially received containers received while in the same cell, if the neighbor cell associated with the containers is the same (e.g., as explicitly identified by the same ARFCN and BSIC). Note, the only information from partially received containers that can be used is that obtained from consecutive instances of PACKET NEIGHBOUR CELL DATA messages (e.g., instances belonging to the same container with consecutive CONTAINER_INDEX values) including the first instance (in which the CONTAINER_INDEX has a value of 0) within a container. Note also that the inclusion of the ARFCN and BSIC in at least one instance of a PACKET NEIGHBOUR CELL DATA message for a given neighbor cell allows a mobile station to which the PACKET NEIGHBOUR CELL DATA message was not addressed to make use of the contained system information. Because the MS can identify different instances of PACKET NEIGHBOUR CELL DATA belonging to the same container by means of the TFI and CONTAINER_ID fields, it is not necessary to include the ARFCN and BSIC in every such instance.

(IV) Modify section 8.8.2, "Cell Change Notification procedure," to indicate that if a proposed target cell of cell reselection is a GSM cell, the network has indicated it supports the VALID_SI indication and the PACKET CELL CHANGE NOTIFICATION contains measurement reports for one or more GSM cells, the mobile station shall include the VALID_SI indication for as many GSM cells as it is able to report. If the target cell is a GSM cell, the inclusion of this information shall take precedence over the inclusion of measurement reports for non-GSM cells. Note, if the mobile has indicated by means of the VALID_SI indication that it has received the necessary system information for the target cell, the network may omit sending PACKET NEIGHBOUR CELL DATA messages containing that system information.

(V) Modify section 11.1.1.2, "Non-distribution messages," to indicate that, unless explicitly permitted, a non-distribution message shall be ignored by any MS not identified by the address information contained in the non-distribution message.

(VI) Modify section 11.2.3a, "Packet Cell Change Notification", to include VALID_SI indication(s) in the contents of a PACKET CELL CHANGE NOTIFICATION message. For example, define a three (3) bit VALID_SI field in which, if set to '1,' a bit within this field indicates that the mobile station has currently stored system information which was received in the last 30 seconds for the respective neighbor cell identified in the cell PACKET CELL CHANGE NOTIFICATION message. For each instance of the field, bit 0 refers to SI-1, bit 1 to SI-3 and bit 2 to SI-13. Alternatively, define a six (6) bit VALID_SI_BITMAP in which, if set to '1,' a bit within this field indicates that the mobile station has currently stored a specified set or subset of system information (SI-3, SI-13 and, if applicable, S-1) for a particular neighbor cell which was received in the last 30 seconds for the respective cell identified in the cell PACKET CELL CHANGE NOTIFICATION message (i.e., bit 0 corresponds to the first cell listed in the PACKET CELL CHANGE NOTIFICATION message, etc.). This field shall not be included if no GSM cells were reported in the PACKET CELL CHANGE NOTIFICATION message.

(VII) Modify section 11.2.9, "Packet Measurement Report," include VALID_SI indication(s) (e.g., as defined in the modification to section 11.2.3a) in the contents of a PACKET MEASUREMENT REPORT message.

(VIII) Modify section 11.2.9e, "Packet Neighbour Cell Data," to indicate that, although the PACKET NEIGHBOUR CELL DATA message is a non distribution message, mobile stations which are not identified by the address part may decode and act upon the non distribution part of this message.

(IX) Modify section 12.24, "GPRS Cell Options," to include a VALID_SI_SUPPORT bit field in the GPRS cell options information element (where GPRS refers to "general packet radio service"). For example, the VALID_SI_SUPPORT could be a one (1) bit field that indicates whether the cell supports the VALID_SI_BITMAP/VALID_SI field in the PACKET MEASUREMENT REPORT, PACKET CELL CHANGE NOTIFICATION and PACKET ENHANCED MEASUREMENT REPORT. For example, a value of '0' indicates that the cell does not support the VALID_SI_BITMAP/VALID_SI field, whereas a value of '1' indicates that the cell supports the VALID_SI_BITMAP/VALID_SI field.

Figure 13:
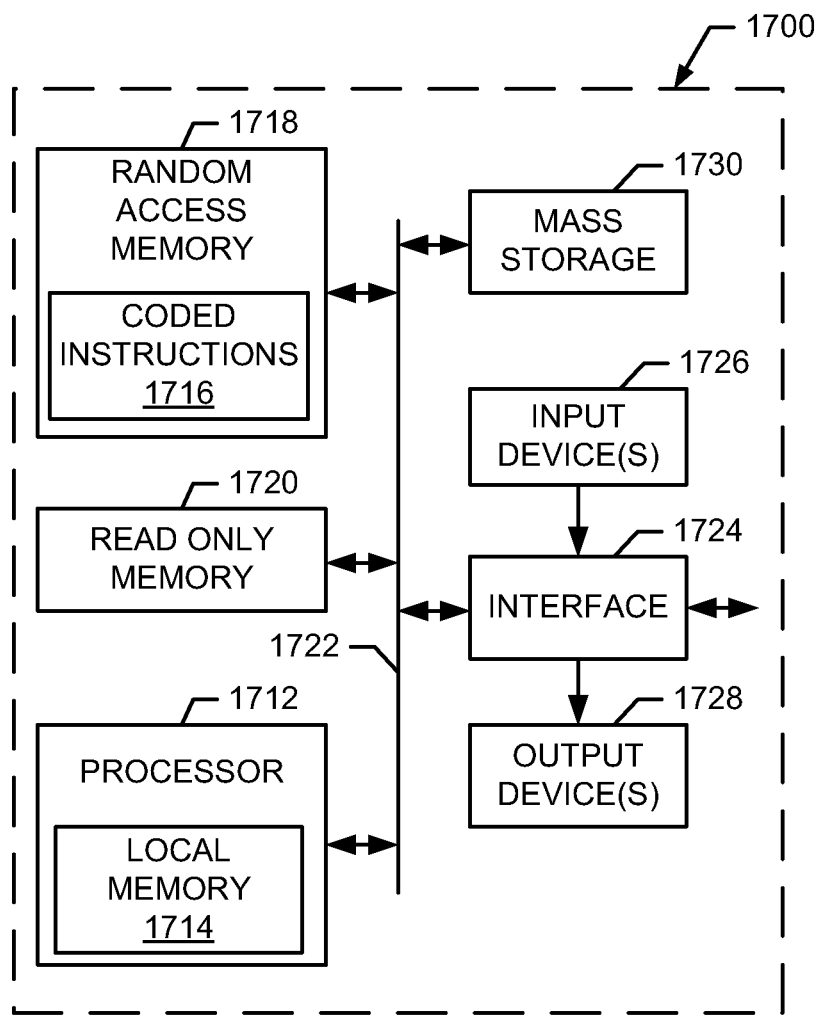
FIG. 13 is a block diagram of an example processing system that may execute example machine readable instructions to implement some or all of the processes of FIGS. 10-12 to implement some or all of the mobile station of FIG. 6, the network element of FIG. 9 and the communication system of FIG. 1.

FIG. 13 is a block diagram of an example processing system 1700 capable of implementing the apparatus and methods disclosed herein. The processing system 1700 can be, for example, a mobile station processing platform, a network element processing platform, a server, a personal computer, a personal digital assistant (PDA), an Internet appliance, a mobile phone, or any other type of computing device.

The system 1700 of the instant example includes a processor 1712 such as a general purpose programmable processor. The processor 1712 includes a local memory 1714, and executes coded instructions 1716 present in the local memory 1714 and/or in another memory device. The processor 1712 may execute, among other things, machine readable instructions to implement the processes represented in FIGS. 10-12. The processor 1712 may be any type of processing unit, such as one or more microprocessors from the Intel® Centrino® family of microprocessors, the Intel® Pentium® family of microprocessors, the Intel® Itanium® family of microprocessors, and/or the Intel® XScale® family of processors, one or more microcontrollers from the ARM® family of microcontrollers, the PIC® family of microcontrollers, etc. Of course, other processors from other families are also appropriate.

The processor 1712 is in communication with a main memory including a volatile memory 1718 and a non-volatile memory 1720 via a bus 1722. The volatile memory 1718 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1720 may be implemented by flash memory and/or any other desired type of memory device. Access to the main memory 1718, 1720 is typically controlled by a memory controller (not shown).

The computer 1700 also includes an interface circuit 1724. The interface circuit 1724 may be implemented by any type of interface standard, such as an Ethernet interface, a universal serial bus (USB), and/or a third generation input/output (3GIO) interface.

One or more input devices 1726 are connected to the interface circuit 1724. The input device(s) 1726 permit a user to enter data and commands into the processor 1712. The input device(s) can be implemented by, for example, a keyboard, a mouse, a touchscreen, a track-pad, a trackball, an isopoint and/or a voice recognition system.

One or more output devices 1728 are also connected to the interface circuit 1724. The output devices 1728 can be implemented, for example, by display devices (e.g., a liquid crystal display, a cathode ray tube display (CRT)), by a printer and/or by speakers. The interface circuit 1724, thus, typically includes a graphics driver card.

The interface circuit 1724 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 1700 also includes one or more mass storage devices 1730 for storing software and data. Examples of such mass storage devices 1730 include floppy disk drives, hard drive disks, compact disk drives and digital versatile disk (DVD) drives. The mass storage device 1730 may implement the memory unit 1015. Alternatively, the volatile memory 1718 may implement the memory unit 1015.

As an alternative to implementing the methods and/or apparatus described herein in a system such as the device of FIG. 13, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to avoid transmission of at least some neighbor cell system information from a network to a mobile station, the method comprising:
   receiving neighbor cell system information;
   setting a validity indication indicating whether the mobile station has valid neighbor cell system information associated with a neighbor cell, the validity indication to indicate that a first portion of the neighbor cell information is valid if the first portion of the neighbor cell information was received correctly within a preceding first specified time period but not if the first portion of the neighbor cell information was received before the preceding first specified time period, the neighbor cell system information corresponding to system information broadcast by the neighbor cell; and
   sending a message identifying the neighbor cell and including the validity indication to the network if the validity indication was not already sent within a preceding second time period via a second message.

2. A method as defined in claim 1 wherein the validity indication further indicates whether the network can omit subsequent sending of at least the first portion of the neighbor cell system information associated with the neighbor cell to the mobile station.

3. A method as defined in claim 1 wherein the validity indication comprises a plurality of validity indicators, the neighbor cell system information comprises a plurality of system information messages, and each validity indicator is associated with a respective system information message, and wherein the method further comprises setting a first validity indicator based on whether a respective first system information message is stored by the mobile station.

4. A method as defined in claim 3 wherein the validity indication corresponds to a bitmap and each validity indicator corresponds to a bit in the bitmap.

5. A method as defined in claim 3 further comprising discarding the first stored system information message after the respective first system information message has been stored for at least the first time period.

6. A method as defined in claim 1 wherein the validity indication comprises a plurality of validity indicators, the neighbor cell system information comprises a plurality of system information messages, and each validity indicator is associated with a respective neighbor cell in a plurality of neighbor cells, and wherein the method further comprises setting a validity indicator associated with a particular neighbor cell based on whether the plurality of system information messages for the particular neighbor cell are stored by the mobile station.

7. A method as defined in claim 1 wherein sending the message to the network comprises:
   including the validity indication in a measurement report; and
   sending the measurement report to the network.

8. A method as defined in claim 7 wherein the neighbor cell is a global system for mobile communications (GSM) cell, and wherein the method further comprises prioritizing including the validity indication in the measurement report over including a measurement corresponding to a non-GSM cell.

9. A method as defined in claim 7 wherein the measurement report is associated with a packet cell change notification (PCCN) message.

10. A method as defined in claim 7 wherein the measurement report corresponds to a packet measurement report associated with an NC2 mode of operation.

11. A method as defined in claim 1 further comprising determining whether the network supports receiving the validity indication.

12. A method as defined in claim 1 further comprising:
setting a plurality of validity indications representing whether the mobile station has valid neighbor cell system information associated with each of a respective plurality of neighbor cells being measured by the mobile station; and
sending the plurality of validity indications to the network to indicate whether the network can omit subsequent sending of at least a portion of the neighbor cell system information associated with each of the plurality of neighbor cells to the mobile station.

13. A method to avoid transmission of at least some neighbor cell information from a network to a mobile station, the method comprising:
receiving, from the mobile station, a message identifying a neighbor cell and including a validity indication indicating whether the mobile station has valid neighbor cell information associated with the neighbor cell identified in the message, the validity indication to indicate that a first portion of the neighbor cell information is valid if the first portion of the neighbor cell information was received correctly by the mobile station within a first specified time period preceding sending of the message but not if the first portion of the neighbor cell information was received by the mobile station before the first specified time period, the neighbor cell information corresponding to system information broadcast by the neighbor cell, the mobile station to send the message including the validity indication to the network if the validity indication was not already sent by the mobile station within a preceding second time period via a second message; and
determining whether to schedule sending of the neighbor cell information associated with the neighbor cell to the mobile station based on the received validity indication.

14. A method as defined in claim 13 wherein the validity indication comprises a plurality of validity indicators, the neighbor cell information comprises a plurality of system information messages, and each validity indicator is associated with a respective system information message, and wherein the method further comprises processing a first validity indicator to determine whether a respective first information message is stored by the mobile station.

15. A method as defined in claim 13 wherein the validity indication comprises a plurality of validity indicators, the neighbor cell information comprises a plurality of system information messages, and each validity indicator is associated with a respective neighbor cell in a plurality of neighbor cells, and wherein the method further comprises processing each validity indicator to determine whether the plurality of system information messages for a respective neighbor cell are stored by the mobile station.

16. A method as defined in claim 13 wherein receiving the message from the mobile station comprises:
receiving a measurement report; and
decoding the measurement report to obtain the validity indication.

17. A method as defined in claim 16 wherein the measurement report is associated with a packet cell change notification (PCCN) message.

18. A method as defined in claim 16 wherein the measurement report corresponds to a packet measurement report associated with an NC2 mode of operation.

19. A method as defined in claim 13 further comprising indicating to the mobile station whether the network supports receiving the validity indication.

* * * * *